(12) United States Patent
Olivastri

(10) Patent No.: US 10,650,211 B2
(45) Date of Patent: May 12, 2020

(54) ARTIFICIAL INTELLIGENCE-BASED MACHINE READABLE SYMBOL READER

(71) Applicant: DATALOGIC IP TECH, S.R.L., Bologna (IT)

(72) Inventor: Silvio Olivastri, Bologna (IT)

(73) Assignee: Datalogic IP Tech, S.r.l., Bologna (IT)

(*) Notice: Subject to any disclaimer, the term of this patent is extended or adjusted under 35 U.S.C. 154(b) by 106 days.

(21) Appl. No.: 15/938,983

(22) Filed: Mar. 28, 2018

(65) Prior Publication Data

US 2019/0303636 A1 Oct. 3, 2019

(51) Int. Cl.
*G06K 7/14* (2006.01)
*G06N 20/00* (2019.01)
(Continued)

(52) U.S. Cl.
CPC .......... *G06K 7/1482* (2013.01); *G06K 7/01* (2013.01); *G06K 7/10831* (2013.01); *G06N 3/02* (2013.01);
(Continued)

(58) Field of Classification Search
CPC .............................. G06N 20/00; G06K 7/1482
See application file for complete search history.

(56) References Cited

U.S. PATENT DOCUMENTS 5,473,150 A * 12/1995 Huhn ................. G06K 7/10643
235/462.37
6,616,039 B1 * 9/2003 Saporetti ............ G06K 7/10722
235/454
(Continued)

FOREIGN PATENT DOCUMENTS

CN 104680508 A 6/2015

OTHER PUBLICATIONS

Kingma et al., "Adam: A Method for Stochastic Optimization," 3$^{rd}$ *International Conference for Learning Representations*, San Diego, California, 2015, 15 pages.
(Continued)

*Primary Examiner* — Christle I Marshall
(74) *Attorney, Agent, or Firm* — Cozen O'Connor

(57) ABSTRACT

Systems and methods for establishing optimal reading conditions for a machine-readable symbol reader. A machine-readable symbol reader may selectively control reading conditions including lighting conditions (e.g., illumination pattern), focus, decoder library parameters (e.g., exposure time, gain), etc. Deep learning and optimization algorithms (e.g., greedy search algorithms) are used to autonomously learn an optimal set of reading parameters to be used for the reader in a particular application. A deep learning network (e.g., a convolutional neural network) may be used to locate machine-readable symbols in images captured by the reader, and greedy search algorithms may be used to determine a reading distance parameter and one or more illumination parameters during an autonomous learning phase of the reader. The machine-readable symbol reader may be configured with the autonomously learned reading parameters, which enables the machine-readable symbol reader to accurately and quickly decode machine-readable symbols (e.g., direct part marking (DPM) symbols).

20 Claims, 15 Drawing Sheets

(51) Int. Cl.
*G06K 7/01* (2006.01)
*G06N 3/02* (2006.01)
*G06K 7/10* (2006.01)

(52) U.S. Cl.
CPC ... *G06N 20/00* (2019.01); *G06K 2007/10485* (2013.01)

(56) References Cited

U.S. PATENT DOCUMENTS

| | | | | |
|---|---|---|---|---|
| 2011/0309150 | A1* | 12/2011 | Jovanovski | G06K 7/10554 235/462.06 |
| 2017/0169315 | A1 | 6/2017 | Vaca Castano et al. | |
| 2018/0137318 | A1* | 5/2018 | Canini | G06K 7/10811 |

OTHER PUBLICATIONS

Li et al., "Course Notes, CS231n Convolutional Neural Networks for Visual Recognition," Stanford University, Stanford, California, downloaded from http://cs231n.github.io/ on Apr. 9, 2018, 237 pages, 2018.

Li et al., "Lecture 11 : Detection and Segmentation," Stanford University, Stanford, California, downloaded from http://cs231n.stanford.edu/slides/2017/cs231n_2017_lecture11.pdf on Apr. 6, 2018, 95 pages, 2017.

Li et al., "Transfer Learning, CS231n Convolutional Neural Networks for Visual Recognition," Stanford University, Stanford, California, downloaded from http://cs231n.github.io/ on Apr. 6, 2018, 237 pages, 2018.

Lipson, "Informed Search," Cornell University, Ithaca, New York, downloaded from http://www.cs.cornell.edu/courses/cs4700/2011fa/lectures/03_InformedSearch.pdf on Apr. 6, 2018, 40 pages, 2011.

Mir et al., "An extensive empirical evaluation of focus measures for digital photography," *SPIE Proceedings 9023*, IS&T/SPIE Electronic Imaging, San Francisco, California, 11 pages, 2014.

Sermanet et al., "OverFeat: Integrated Recognition, Localization and Detection using Convolutional Networks," *International Conference on Learning Representations CBLS, 2014*, Banff National Park, Canada, 16 pages.

Szegedy et al., "Deep Neural Networks for Object Detection, " *Proceedings of the 26th International Conference on Neural Information Processing Systems 2*, Lake Tahoe, Nevada, Dec. 5-10, 9 pages, 2013.

* cited by examiner

ARTIFICIAL INTELLIGENCE-BASED MACHINE READABLE SYMBOL READER

BACKGROUND

Technical Field

The present disclosure generally relates to machine-readable symbol readers that illuminate and optically read machine-readable symbols.

Description of the Related Art

Machine-readable symbols encode information in a form that can be optically read via machine-readable symbol reader. Machine-readable symbols take a variety of forms, the most commonly recognized form being the linear or one-dimensional barcode symbol. Other forms include two-dimensional machine-readable symbols such as stacked code symbols, and area or matrix code symbols. These machine-readable symbols are typically composed of patterns of high and low reflectance areas. For instance, a barcode symbol may comprise a pattern of black bars on a white background. Also for instance, a two-dimensional symbol may comprise a pattern of black marks (e.g., bars, squares or hexagons) on a white background. Machine-readable symbols are not limited to being black and white, but may comprise two other colors, may include more than two colors (e.g., more than black and white). Machine-readable symbols may include directly marked materials (i.e. direct part marking or DPM) having the symbols formed in a surface (e.g., laser etched, dot-peened, or otherwise inscribed in a surface).

Machine-readable symbols are typically composed of elements (e.g., symbol characters) which are selected from a particular machine-readable symbology. Information is encoded in the particular sequence of shapes (e.g., bars) and spaces which may have varying dimensions. The machine-readable symbology provides a mapping between machine-readable symbols or symbol characters and human-readable symbols (e.g., alpha, numeric, punctuation, commands). A large number of symbologies have been developed and are in use, for example Universal Product Code (UPC), European Article Number (EAN), Code 39, Code 128, Data Matrix, PDF417, etc.

Machine-readable symbols have widespread and varied applications. For example, machine-readable symbols can be used to identify a class of objects (e.g., merchandise) or unique items (e.g., patents). As a result, machine-readable symbols are found on a wide variety of objects, such as retail goods, company assets, and documents, and help track production at manufacturing facilities and inventory at stores (e.g., by scanning items as they arrive and as they are sold). In addition, machine-readable symbols may appear on a display of a portable electronic device, such as a mobile telephone, personal digital assistant, tablet computer, laptop computer, or other device having an electronic display.

Machine-readable symbol readers or data readers are used to capture images or representations of machine-readable symbols appearing on various surfaces to read the information encoded in the machine-readable symbol. One commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Such is in contrast to scanning or laser-based (i.e., flying spot) type machine-readable symbol readers, which scan a relatively narrow beam or spot of light sequentially across the machine-readable symbol. Machine-readable symbol readers are commonly referred to as a "scanner" or "barcode scanner" whether they employ flood illumination or a scanning laser beam, or whether they read one-dimensional or two-dimensional machine-readable symbols.

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the machine-readable symbol. One-dimensional CCD or CMOS readers capture a linear cross-section of the machine-readable symbol, producing an analog waveform whose amplitude represents the relative darkness and lightness of the machine-readable symbol. Two-dimensional CCD or CMOS readers may capture an entire two-dimensional image. The image is then processed to find and decode a machine-readable symbol. For example, virtual scan line techniques for digitally processing an image containing a machine-readable symbol sample across an image along a plurality of lines, typically spaced apart and at various angles, somewhat like a scan pattern of a laser beam in a scanning or laser-based scanner.

Reading a symbol typically employs generating an electrical signal or digital value having an amplitude determined by the intensity of the collected light. Relatively less reflective or darker regions (e.g., bars or other marks) may, for example, be characterized or represented in the electrical signal or digital value by an amplitude below a threshold amplitude, while relatively more reflective or lighter regions (e.g., white spaces) may be characterized or represented in the electrical signal or digital value by an amplitude above the threshold amplitude. When the machine-readable symbol is scanned using laser or "flying spot," positive-going and negative-going transitions in the electrical signal occur, signifying transitions between darker regions and lighter regions. Techniques may be used for detecting edges of darker regions and lighter regions by detecting the transitions of the electrical signal. Techniques may also be used to determine the dimensions (e.g., width) of darker regions and lighter regions based on the relative location of the detected edges and decoding the information represented by the machine-readable symbol.

One of the most difficult tasks for machine-readable symbol readers is to read a DPM (e.g., Data Matrix) machine-readable symbol inscribed on a surface since such symbols typically exhibit much lower contrast relative to conventional black and white labels. A manufacturing process can also degrade a symbol's appearance. Often, it may be required to utilize specialized lighting conditions to read DPM machine-readable symbols. Different types of illumination include bright-field illumination, dark-field illumination, diffuse illumination, combinations thereof, as well as various spatial illumination patterns. Bright-field illumination projects light directly at the marked surface. Although bright-field illumination is simple and inexpensive, it may not always produce the best results, as it generally works best for high-contrast labels and DPM symbols marked on less reflective surfaces. Dark-field illumination projects light at the mark surface at a low angle. For marking methods such as dot peen, the low angle provides superior contrast relative to bright-field illumination. Diffuse illumination creates a diffuse, even light across a marked surface that may be beneficial for marks placed on curved parts or highly reflective materials.

For in-line automated production, a reading conditions configuration for a machine-readable symbol reader may be determined at installation and fixed during use. However, due to the large number (e.g., several thousands) of possible reading condition configurations, determining an optimal or even satisfactory reading condition configuration for a particular machine-readable symbol reader installation can be extremely difficult and time consuming.

BRIEF SUMMARY

A machine-readable symbol reader may be summarized as including: an imager subsystem comprising an image sensor and a variable focus lens; at least one nontransitory processor-readable storage medium that stores at least one of processor-executable instructions or data; and at least one processor communicatively coupled to the imager subsystem and the at least one nontransitory processor-readable storage medium, in operation, the at least one processor: configures a set of reading parameters of the machine-readable symbol reader to learned values previously determined during an initial autonomous learning phase; controls the imager subsystem to capture an input image with the set of reading parameters configured to the learned values; locates at least one machine-readable symbol in the input image using a trained deep learning network; decodes the located at least one machine-readable symbol; and stores the at least one decoded machine-readable symbol in the at least one nontransitory processor-readable storage medium.

The set of reading parameters may include one or more parameters associated with lighting condition, focus, or decoder parameters. The set of reading parameters may include one or more parameters associated with an illumination pattern generated by at least one light source of the machine-readable symbol reader, exposure time, or gain. The trained deep learning network may receive as input the input image, and may generate as output an output matrix indicative of whether each of a plurality of regions of the input image includes a machine-readable symbol. The trained deep learning network may include a plurality of convolutional layers, a plurality of maximum pooling layers, and a plurality of inception layers. The trained deep learning network may include a deep learning network that has been pre-trained using non-background images other than images of machine-readable symbols.

A machine-readable symbol reader may be summarized as including: an imager subsystem comprising an image sensor and a variable focus lens; at least one nontransitory processor-readable storage medium that stores at least one of processor-executable instructions or data; and at least one processor communicatively coupled to the imager subsystem and the at least one nontransitory processor-readable storage medium, in operation, the at least one processor: implements an autonomous learning phase, in which the at least one processor: executes an autofocus algorithm to determine a learned value for a reading distance parameter; focuses the variable focus lens according to the learned value for the reading distance parameter; determines one or more illumination parameters using a greedy search algorithm; and configures the machine-readable symbol reader with the learned values for the reading distance parameter and the one or more illumination parameters.

To determine the one or more illumination parameters using a greedy search algorithm, the at least one processor may: iteratively, until a stop condition is reached, modify a value of at least one of the one or more illumination parameters; capture an input image; locate at least one machine-readable symbol in the input image using a trained deep learning network; attempt to decode the located at least one machine-readable symbol; determine a quality measure based at least in part on the attempt to decode the machine-readable symbol; compare the determined quality measure to the stop condition; and assign the learned values to be equal to the respective values of the one or more illumination parameters when the stop condition is reached. The quality measure may include a value associated with a percentage of the attempts to decode the machine-readable symbol that are successful. The at least one processor may modify a value of at least one of the one or more illumination parameters based at least in part on an amount of time required to successfully decode a machine-readable symbol. The one or more illumination parameters may include one or more parameters associated with an illumination pattern generated by at least one light source of the machine-readable symbol reader, exposure time, or gain. The one or more illumination parameters may include a reduced subset of controllable illumination parameters of the machine-readable symbol reader. To execute the autofocus algorithm, the at least one processor may determine a focus measure for each of a plurality of captured input images, and search for a best reading distance parameter using a greedy search algorithm based on the determined focus measures. To execute the autofocus algorithm, the at least one processor may capture a plurality of input images when the reading distance parameter is set at differing values; and for each of the input images, attempt to locate at least one machine-readable symbol using a trained deep learning network.

A machine learning system, may be summarized as including: at least one nontransitory processor-readable storage medium that stores at least one of processor-executable instructions or data; and at least one processor communicatively coupled to the at least one nontransitory processor-readable storage medium, in operation, the at least one processor: receives training data comprising a plurality of training images of the same dimension, each of the plurality of training images associated with respective label metadata that indicates whether the respective training image depicts a machine-readable symbol; trains a convolutional neural network (CNN) model in a supervised manner based at least in part on the received training data, wherein the CNN model receives as input a training image and its associated label metadata, and generates as output a classification indicative of whether the training image includes a machine-readable symbol; modifies the CNN model to generate a trained localization CNN model that receives as input an input image of any dimension and generates as output an output matrix indicative of whether each of a plurality of regions of the input image includes a machine-readable symbol; and stores the trained localization CNN model in the nontransitory processor-readable storage medium.

The at least one processor may train the CNN model using a transfer learning technique in which the at least one processor fine-tunes a pre-trained CNN model that has been trained on data other than the received training data. At least some of the training images may include images that depict direct part marking (DPM) machine-readable symbols. The at least one processor may generate the training data, wherein, to generate the training data, the at least one processor may: receive a plurality of initial images, the images captured by a machine-readable symbol reader at various combinations of reading conditions; for each of the initial images, generate a plurality of cropped images, each of the cropped images comprising a portion of the initial image; and logically associate label metadata with each of the cropped images, the label metadata indicative of whether the cropped image includes a machine-readable symbol. The at least one processor may at least one of rotate, translate, or resize at least some of the cropped images. The trained localization CNN model may include a plurality of convolutional layers, a plurality of maximum pooling layers, and a plurality of inception layers.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
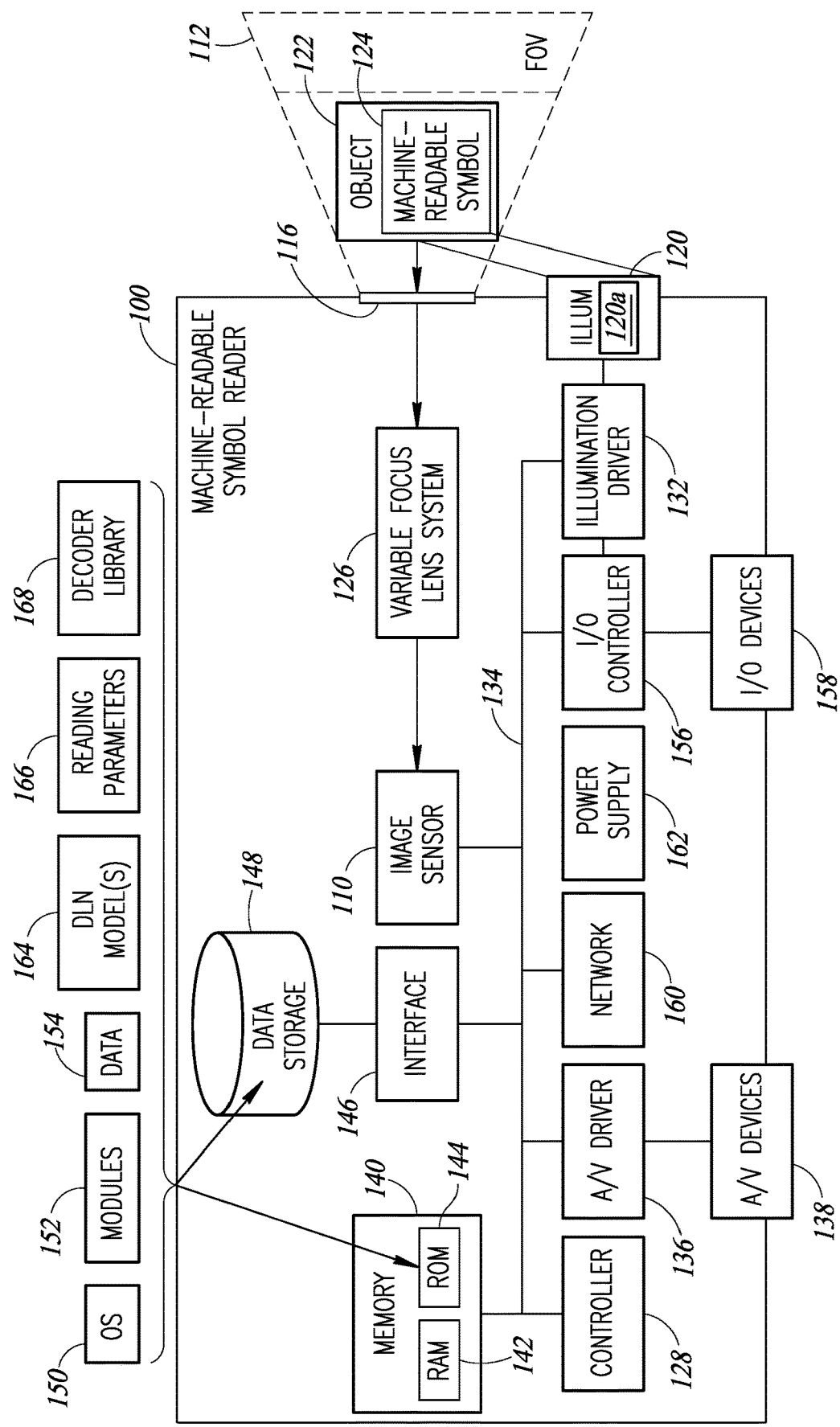
FIG. 1 is a block diagram of a machine-readable symbol reader and an object bearing a machine-readable symbol to be read, according to at least one illustrated implementation.
Figure 2A:
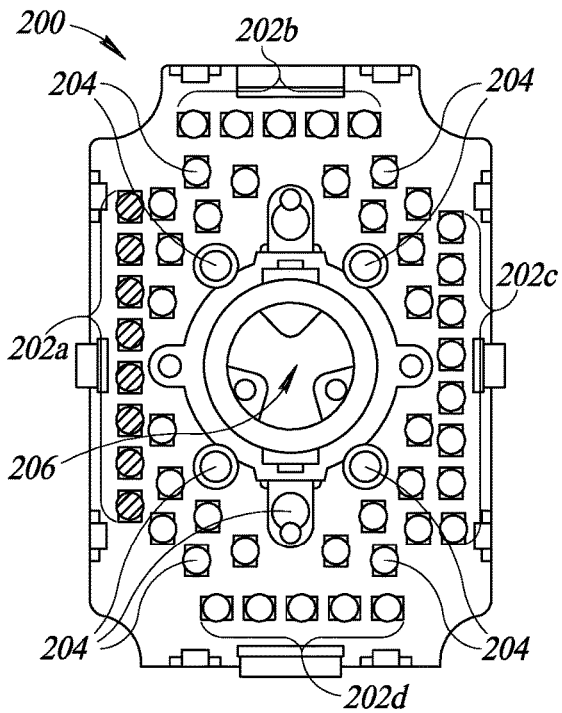
FIG. 2A is a front view of an illumination system of a machine-readable symbol reader, showing a first sector of four sectors of light sources illuminated, according to one illustrated implementation.
Figure 2B:
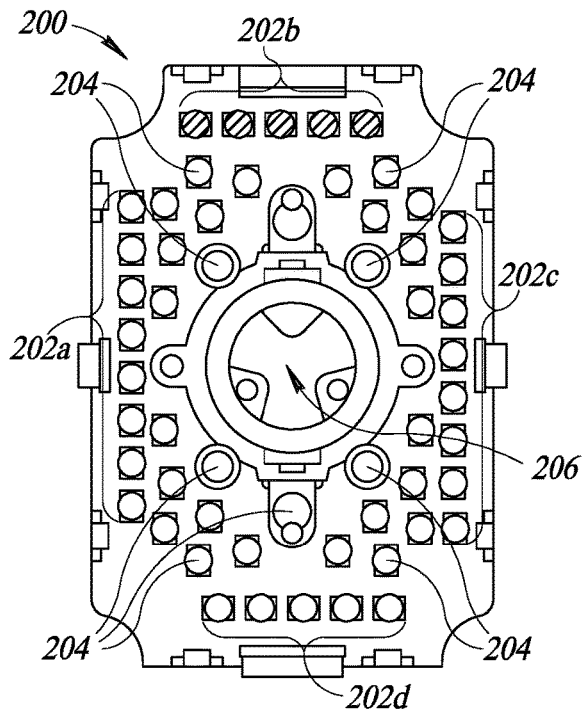
FIG. 2B is a front view of the illumination system shown in FIG. 2A, showing the second sector of light sources illuminated, according to one illustrated implementation.
Figure 2C:
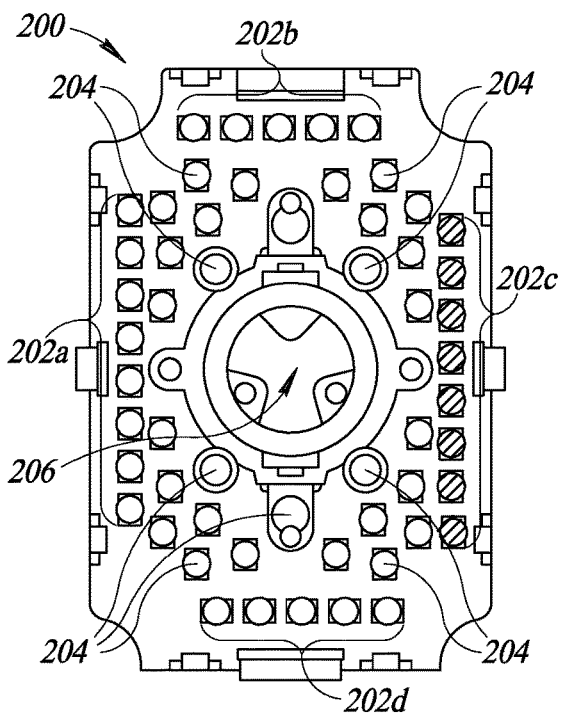
FIG. 2C is a front view of the illumination system shown in FIG. 2A, showing the third sector of light sources illuminated, according to one illustrated implementation.
Figure 2D:
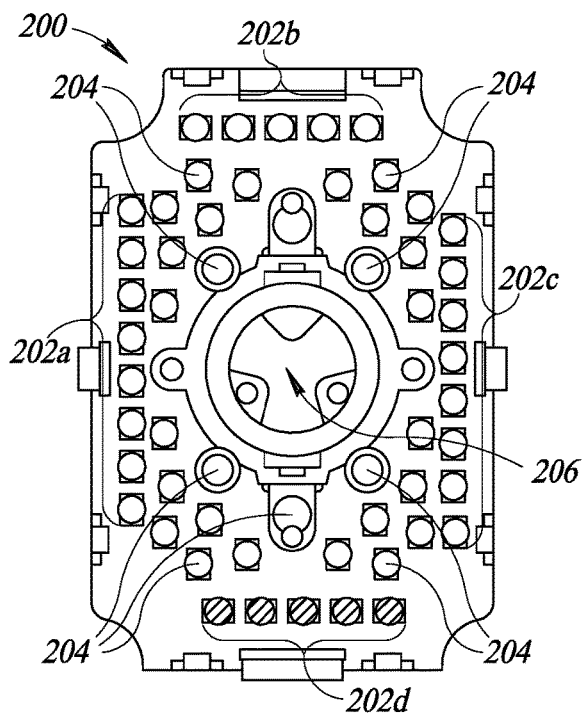
FIG. 2D is a front view of the illumination system shown in FIG. 2A, showing the fourth sector of light sources illuminated, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to systems and methods of establishing optimal (or acceptable) reading conditions for a machine-readable symbol reader. As discussed in detail below, this is achieved by selectively controlling reading conditions including lighting conditions (e.g., illumination pattern or other illumination parameters), focus, decoder library parameters (e.g., exposure time, gain), or other reading conditions. The systems and methods discussed herein utilize deep learning and optimization algorithms implemented directly in a machine-readable symbol reader ("embedded"), in a client processor-based device (e.g., PC), or in a remote system (e.g., server, cloud-based system).

As discussed further below, in at least some implementations, the system utilizes convolutional neural networks (CNN) and/or greedy search algorithms to autonomously learn an optimal set of reading parameters to be used for a machine-readable symbol reader in a particular application. The CNN may be used to locate machine-readable symbols in images captured by a machine-readable symbol reader, and greedy search algorithms may be used to determine a reading distance parameter and to determine one or more illumination parameters (e.g., luminance, illumination pattern) during an autonomous learning phase of the machine-readable symbol reader that is implemented, for example, during installation of the machine-readable symbol reader. The various features of the present disclosure are discussed below with reference to the Figures.

FIG. 1 is a block diagram of a machine-readable symbol reader 100, according to one illustrated implementation. The machine-readable symbol reader 100 includes an image sensor or sensor array 110, which can capture images of a field of view 112 through a window 116. The field of view 112 can be focused onto the sensor array 110. Image frames captured by the sensor array 110 may include light emanating from one of the field of view 112.

The machine-readable symbol reader 100 includes one or more active light or illumination systems 120, which are operable to generate light and illuminate the field of view 112 in a forward direction (i.e., in front of a nose of the machine-readable symbol reader 100). The active illumination system(s) 120 can comprise any suitable source of light, such as one or more light emitting diodes (LEDs), flash strobes, incandescent or fluorescent lamps, or halogen bulbs. The active illumination system(s) 120 may generate light having one or more wavelengths or ranges of wavelength. The active illumination system(s) 120 can pass light or illumination through an optical element 120a prior to passing out of the machine-readable symbol reader 100 into an exterior or external environment. As described elsewhere herein, in some implementations the optical element 120a can take the form of a waveguide or other light transmissive structure.

The illumination system 120 may be operative to provide diffuse lighting, bright-field illumination, dark-field illumination, or combinations thereof. FIGS. 2A-2D, discussed below, show an example implementation of an illumination system 200 for a machine-readable symbol reader that provides various configurable illumination types and patterns.

FIG. 1 also illustrates an item or object 122 positioned within the field of view 112. The object 122 includes a machine-readable symbol 124 (e.g., PDF417, Code 128, etc.) that is to be detected and/or decoded by the machine-readable symbol reader 100. In particular, the object 122 may have a surface which bears a machine-readable symbol 124. The machine-readable symbol 124 can, for example, take the form of a DPM symbol, etched or otherwise inscribed directly on or in the surface of the object 122.

The machine-readable symbol reader 100 includes a variable focus lens system 126 positioned and oriented to focus light onto the sensor array 110. For example, the lens system 126 may comprise an array of optics (e.g., optical elements) with a common optical axis. The variable focus lens system 126 may also comprise a zoom lens coupled to a controller 128 to control an amount of optical zoom.

In at least some implementations, the variable focus lens system 126 utilizes variable focus liquid lens technology that has no mechanical moving parts. Compared to a conventional moving-part mechanical lens system, a liquid lens system may be relatively compact, more reliable, and may be able to focus/zoom more quickly. Generally, a liquid lens may include two immiscible fluids that have different refractive indices. One of the fluids is typically water, which is electrically conductive. The other fluid is typically an electrically non-conductive oil. The two fluids may be contained in a cylinder or tube that has a hydrophobic coating applied to the inner walls and two optically clear ends through which light can pass. A meniscus is formed at the interface between the water and oil that has a hemispherical shape and functions like a spherically curved optical lens. The liquid lens may be focused using a technique referred to as electrowetting, wherein the shape of the meniscus is changed via applying an electric field across the hydrophobic coating to vary the degree of hydrophobic or water-resistant property. The change in surface tension alters the radius of curvature of the meniscus between the two fluids and hence the focal length of the lens. By varying the electric signal or voltage to the liquid lens, the curvature of the meniscus or lens can concurrently be varied from an initial convex shape in one position to concave in another position and every shape therebetween including flat. The lens shape transitions can be effected smoothly and quickly, without any moving parts.

The sensor array 110 forms an electronic image of the field of view 112. The sensor array 110 may comprise a wide range of image or optical sensing devices for converting an optical image (or another wavelength in the electromagnetic spectrum) into an electrical signal or digital representation. For example, the sensor array 110 may comprise a digital sensor, such as a charge-coupled device (CCD) sensor array or complementary metal-oxide semiconductor (CMOS) sensor array, both of which form a one-dimensional or two-dimensional array of pixels, which together constitute an electronic or digital representation of the image. Each pixel location stores data indicative of the light intensity at that location of the image. The light intensity data for each pixel may represent a monochrome intensity (e.g., grayscale), or alternatively a color (e.g., red-green-blue). After the sensor array 110 has been exposed to light emanating from field of view 112, data from all the pixels can be sequentially read out in a selectable pattern (which may be row-by-row, sub-region by sub-region, or some other pattern). The pixel intensity data may optionally be converted to digital form using an analog-to-digital converter (not shown).

Typically, in response to receiving an instruction from a controller 128, the sensor array 110 captures or acquires one or more images of the field of view 112. Conceptually, a read volume of the reader 100 includes a portion of space in front of the window 116 in which machine-readable symbols may be read (e.g., detected and decoded) by the machine-readable symbol reader 100. In other words, the read volume may be referred to as a view volume within which there is a relatively high probability of a successful scan/read. The instruction may be generated in response to a user input, for example an activation (e.g., pull, pressing) of a switch, for example a trigger (not separately illustrated in FIG. 1).

After the sensor array 110 has been exposed to light reflected or otherwise returned by the object 122, data from all or a portion of the pixels can be sequentially read out in a selectable pattern (which may be row-by-row, column-by-column, or some other pattern). The pixel intensity data may optionally be converted to digital form using an analog-to-digital converter (ADC) circuit before being supplied to the controller 128. The controller 128 may include or comprise a DSP, for example, a DSP architecture such as the Blackfin® processor family from Analog Devices, Norwood, Mass., or a microcontroller, such as the high-speed ARM® processor family from ARM Ltd., Cambridge, United Kingdom. Briefly stated, the controller 128 processes the image data so as to attempt to decode a machine-readable symbol that has been focused onto the sensor array 110, and thus is denominated as a decode engine. The controller 128 may condition the data received from the sensor array 110 and may generate an output that generally identifies which regions of the image correspond to highly reflective or light areas, and which correspond to less reflective or dark areas, for example.

One or more illumination drivers or controllers 132 apply signals to the active illumination system 120 to, for example, strobe active illumination source at desired times or in response to activation of a trigger by a user, or alternatively to light the active illumination source(s) constantly for a period of time, for instance in response to actuation of a trigger by a user or by a motion sensor. The active illumination system 120 can be mounted within a housing of the machine-readable symbol reader 100 (e.g., behind window 116).

The sensor array 110 and the illumination driver 132 are communicatively coupled to the controller 128, which may be, for example, one or more of a processor, microprocessor, controller, microcontroller, digital signal processor (DSP), graphical processing unit (GPU), application specific integrated circuit (ASIC), programmable gate array (PGA), or the like (generally "processor"). Some implementations may include a dedicated machine-readable symbol scan module as the controller 128. The communicative coupling may be via a bus 134 or other communication mechanism, such as direct connections of a serial, parallel, or other type. The controller 128 generally controls and coordinates the operation of other devices to which it is connected, such as one or more of the sensor array 110, the illumination driver 132, and an audio/visual (A/V) driver 136. The A/V driver 136 is optionally included to drive one or more audio devices 138, such as a buzzer, speaker, or other audible indicator, to produce an audible "beep" or other indication when a machine-readable symbol is successfully read. In addition, or alternatively, the A/V driver 136 may drive an LED or other visual indicator devices 138 when a machine-readable symbol has been successfully read. Other devices or subsystems, such as a cash register or electronic scale, may also be connected to the controller 128. Moreover, the controller 128 and/or the bus 134 may interface with other controllers or computers, such as a cash register system or checkout terminal. Some implementations can include a user operable trigger or other switch, operation of which can cause the machine-readable symbol reader 100 to read machine-readable symbols.

The machine-readable symbol reader 100 also includes one or more non-transitory media, for example, memory 140, which may be implemented using one or more standard memory devices. The memory devices 140 may include, for instance, flash memory, RAM 142, ROM 144, and EEPROM devices, and the non-transitory media may also include magnetic or optical storage devices, such as hard disk drives, CD-ROM drives, and DVD-ROM drives. The machine-readable symbol reader 100 may also include an interface 146 coupled to an internal data storage 148, such as a hard disk drive, flash memory, an optical disk drive, or another memory or drive. The interface 146 may be configured for external drive implementations, such as over a USB or other wired or wireless connection.

According to at least one implementation, any number of program modules are stored in the drives (e.g., data storage 148) and/or the memory 140, including an operating system (OS) 150, one or more application programs or modules 152, such as instructions to implement the methods described herein, and data 154. Any suitable operating system 150 may be employed. One of the program modules 152 may comprise a set of instructions stored on one or more computer- or processor-readable media and executable by one or more processors to implement the methods to generate image data using the data reader 100 and/or decode the image data. The data 154 may include one or more configuration settings or parameters, or may include image data from the sensor array 110 and decoded machine-readable symbol data.

As discussed further below, the data storage 148 and/or the memory may store one or more deep learning network (DLN) models 164 (e.g., CNN models), reading parameters 166 that allow the machine-readable symbol reader 100 to configure itself for optimal reading conditions, and a decoder library 168 that facilitates decoding of one or more types of machine-readable symbols.

The machine-readable symbol reader 100 may include a number of other components that interface with one another via the bus 134, including an input/output (I/O) controller 156 and one or more I/O devices 158, and a network interface 160. For example, the I/O controller 156 may implement a display controller and the I/O devices 158 may include a display device to present data, menus, and prompts, and otherwise communicate with the user via one or more display devices, such as a transmissive or reflective liquid crystal display (LCD) or other suitable display. For example, the I/O controller 156 and I/O device 158 may be operable to display a navigable menu system or graphical user interface (GUI) that allows the user to select the illumination and image capture settings.

The I/O controller 156 may receive user input from one or more input devices, such as a trigger, keyboard, a pointing device, or other wired/wireless input devices, that allow the user to, for example, program the machine-readable symbol reader 100. Other input devices may be included, such as a microphone, touchscreen, touchpad, and trackball. While the input devices may be integrated into the machine-readable symbol reader 100 and coupled to the controller 128 via the I/O controller 156, input devices may also connect via other interfaces, such as a connector that includes one or more data interfaces, bus interfaces, wired or wireless network adapters, or modems for transmitting and receiving data. Accordingly, the I/O controller 156 may include one or more of hardware, software, and firmware to implement one or more protocols, such as stacked protocols along with corresponding layers. Thus, the I/O connector 156 may function as one or more of a serial port (e.g., RS232), a Universal Serial Bus (USB) port, or an IR interface. The I/O controller 156 may also support various wired, wireless, optical, and other communication standards.

Optional network interface 160 may provide communications with one or more hosts or other devices (e.g., a computer, a point-of-sale terminal, a point-of-sale computer system, or a cash register). For example, data gathered by or decoded by the machine-readable symbol reader 100 may be passed along to a host computer. According to one implementation, the network interface 160 comprises a universal interface driver application-specific integrated circuit (UIDA). The network interface 160 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PC-MCIA), or USB. A wireless connection may use low- or high-powered electromagnetic waves to transmit data using any wireless protocol, such as Bluetooth™, IEEE 802.11b (or other Wi-Fi standards), infrared data association (IrDA), and radiofrequency identification (RFID).

The machine-readable symbol reader 100 may also include one or more power supplies 162, which provide electrical power to the various components of the machine-readable symbol reader 100 via power connections.

Machine-readable symbol readers according to other implementations may have less than all of these components, may contain other components, or both. In addition, the machine-readable symbol reader 100 may include a radiofrequency identification (RFID) reader or interrogator and/or or a magnetic stripe reader. Such may be particularly useful when employed as a point-of-sale (POS) terminal.

FIGS. 2A-2D show front views of an example illumination system 200 of a machine-readable symbol reader, such as the machine-readable symbol reader 100 of FIG. 1. The illumination system 200 includes a plurality of illumination sources. In particular, the illumination system 200 includes a first sector 202a of illumination sources extending along a left side (as shown) of the illumination system, a second sector 202b of illumination sources extending along a top side of the illumination system, a third sector 202c of illumination sources extending along a right side of the illumination system, and a fourth sector 202d of illumination sources extending along a bottom side of the illumination system. The illumination system 200 also includes a number of other illumination sources 204 that may be used to provide internal lighting (e.g., strobe lighting) to illuminate a machine-readable symbol to be decoded.

The illumination sources 202 and 204 are positioned and oriented to emit illumination from the window (e.g., window 116 of FIG. 1) of the head of the machine-readable symbol reader into the exterior environment to illuminate objects bearing machine-readable symbols. The illumination sources 202 and 204 are typically arranged symmetrically about receiving optics and/or image sensor 206.

Each of the sectors 202a-d may be selectively controlled to illuminate. In the illustrated example, the first sector 202a is shown as being illuminated in FIG. 2A, the second sector 202b is shown as being illuminated in FIG. 2B, the third sector 202c is shown as being illuminated in FIG. 2C, and the fourth sector 202d is shown as being illuminated in FIG. 2D. The illumination system 200 may be selectively controlled to illuminate any combination of the four sectors 202a-d during reading of a machine-readable symbol, thereby providing 15 combinations of lighting patterns that may be used. Selection of one or more optimal illumination patterns is discussed further below, e.g., with reference to FIGS. 11-14D.

Figure 3:
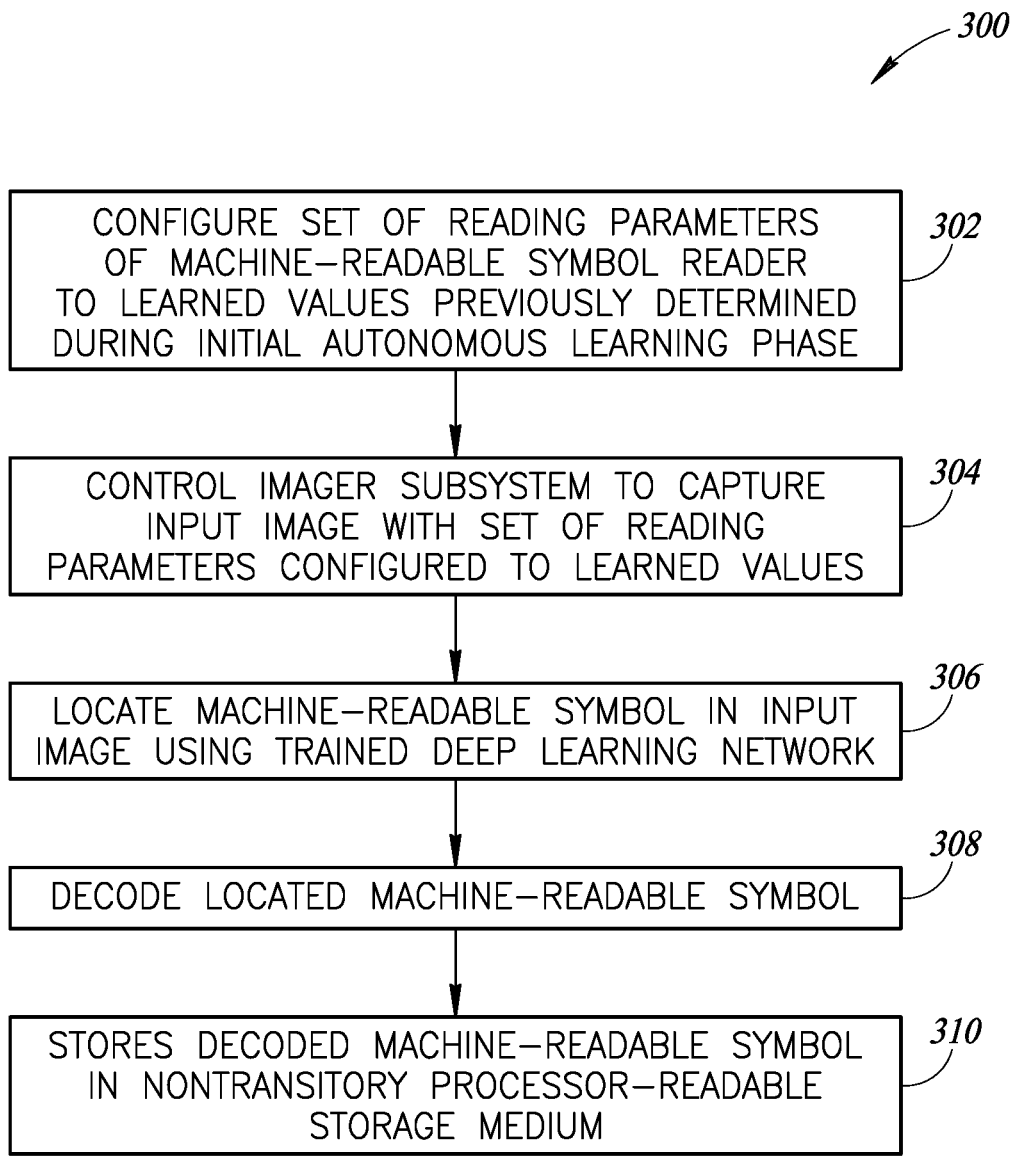
FIG. 3 is a flow diagram for a method of operating a machine-readable symbol reader to decode a machine-readable symbol using learned reading condition parameters, according to one non-limiting illustrated implementation.

FIG. 3 is a flow diagram for a method 300 of operating a machine-readable symbol reader to decode a machine-readable symbol. The method 300 may be implemented using the machine-readable symbol reader 100 of FIG. 1, for example.

The method 300 begins at 302, wherein at least one processor of the machine-readable symbol reader configures a set of reading parameters of the machine-readable symbol reader to learned values previously determined during an initial autonomous learning phase. Example implementations of an autonomous learning phase are discussed below. As an example, the set of reading parameters may include one or more parameters associated with lighting condition (e.g., luminance, illumination pattern), focus (e.g., reading distance), or decoder parameters (e.g., exposure time, gain).

At 304, the at least one processor of the machine-readable symbol reader may control an imager subsystem or receiving optics of the machine-readable symbol reader to capture an input image with the set of reading parameters configured to the learned values. For example, the input image may be captured while a variable focus lens system is focused at a learned reading distance, an illumination system illuminates an object according to a learned lighting condition, and/or a decoder operative to decode machine-readable symbols is configured with learning decoder parameters.

At 306, the at least one processor of the machine-readable symbol reader may locate at least one machine-readable symbol in the input image using a trained deep learning network. As discussed further below, in at least some implementations, the trained deep learning network receives as input the input image, and generates as output an output matrix indicative of whether each of a plurality of regions of the input image includes a machine-readable symbol. In at least some implementations, the trained deep learning network includes a plurality of convolutional layers, a plurality of maximum pooling layers, and a plurality of inception layers. In at least some implementations, the trained deep learning network includes a deep learning network that has been pre-trained using non-background images other than images of machine-readable symbols. Example implementations of deep learning networks of the present disclosure are discussed below with reference to FIGS. 4-7.

At 308, the at least one processor of the machine-readable symbol reader may decode the at least one machine-readable symbol located in the input image. As noted above, the at least one processor may utilize a decoder (or decoder library) that is configured with one or more parameters learned during the autonomous learning phase.

At 310, the at least one processor may store the at least one decoded machine-readable symbol in at least one non-transitory processor-readable storage medium of the machine-readable symbol reader, wherein the decoded symbol may be used for various purposes, such as object tracking, inventory management, facilitating purchases, etc.

Figure 4:
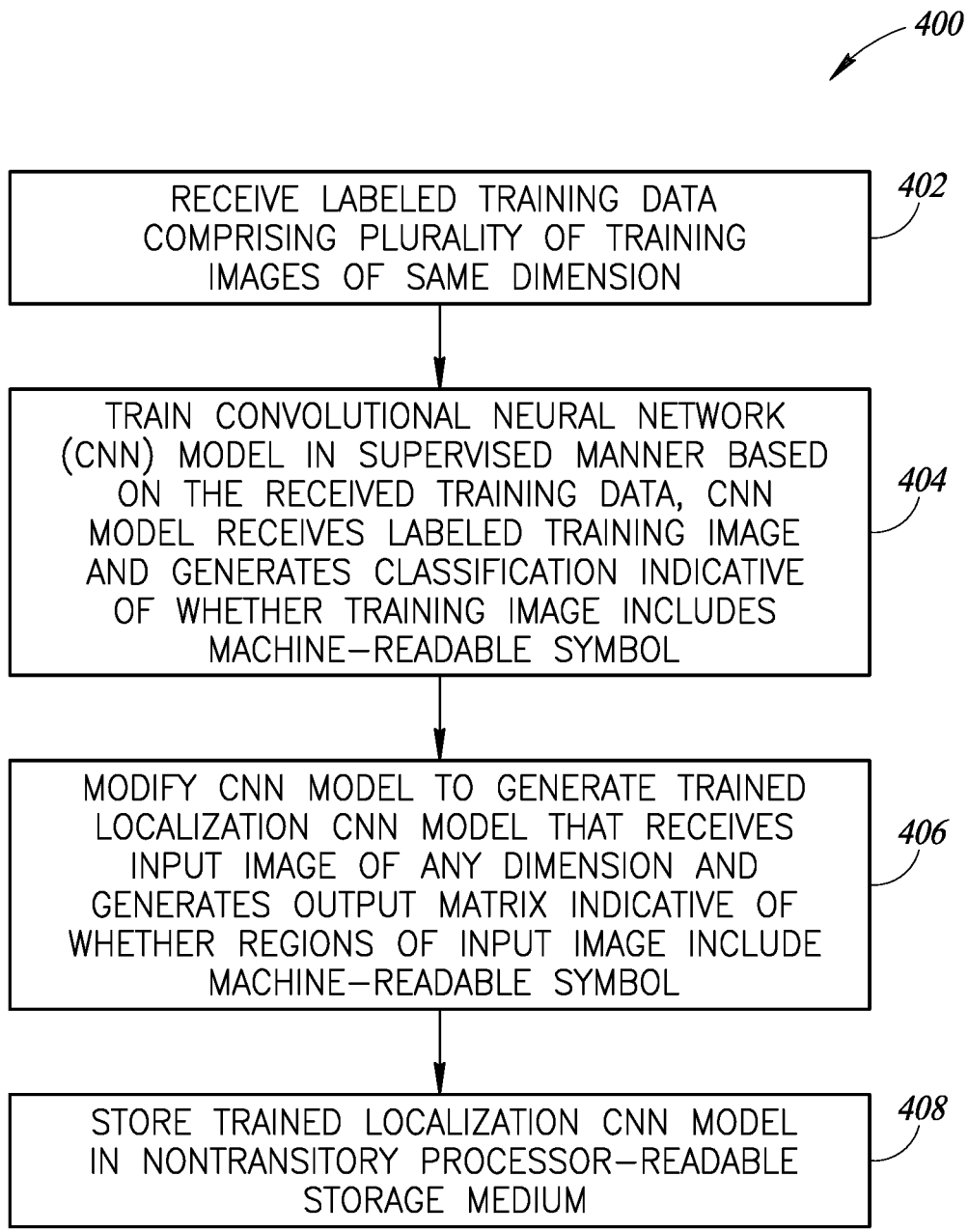
FIG. 4 is a flow diagram for a method of operating a processor-based system to train a convolutional neural network (CNN) model to locate machine-readable symbols in an image captured by a machine-readable symbol reader, according to one non-limiting illustrated implementation.

FIG. 4 is a flow diagram for a method 400 of operating a processor-based system to train a deep learning network, in particular a convolutional neural network (CNN), to locate machine-readable symbols in an image captured by a machine-readable symbol reader. The method 400 may be performed by any suitable processor-based system. For example, the method 400 may be implemented directly in a machine-readable symbol reader ("embedded"), in a client processor-based device (e.g., PC), or in a remote system (e.g., server, cloud-based system).

As an overview, deep learning is a machine learning technique that utilizes multiple layers of artificial neural networks to mimic how the brain works. Generally, artificial neural networks are a system of layers with interconnected "neurons" that exchange data between each other. The connections have numeric weights that can be tuned based on experience, making artificial neural networks adapted to inputs capable of learning.

One important type of deep learning architecture is a convolutional neural network (CNN). Generally, a CNN may be considered as a layered image-processing pipeline designed to perform one or more particular tasks, such as classification, localization, or detection. The pipeline takes images as input, performs mathematical operations, and provides a response. The processing within the CNN may be sequential in nature, i.e., each layer in the network takes input from the layer or layers above it, performs some computation, and passes the resulting output to the next layer or layers.

A CNN generally includes an input layer, an output layer, and multiple hidden layers. The hidden layers typically include convolutional layers, pooling layers, fully connected layers, and/or normalization layers.

Convolutional layers apply a convolution operation to the input, passing the result to the next layer. The convolution operation emulates the response of an individual neuron to visual stimuli. A convolutional layer is a core building block of a CNN. A convolutional layer includes parameters that comprise a set of learnable filters (or kernels), which have a small receptive field, but extend through a full depth of an input volume. During a forward pass, each filter is convolved across a width and height of the input volume, computing the dot product between the entries of the filter and the input and producing a 2-dimensional activation or feature map of that filter. As a result, the network learns filters that activate when it detects some specific type of feature at some spatial position of the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map.

CNNs may also include local or global pooling layers, which are a form of non-linear down sampling that combine the outputs of neuron clusters of one layer into a single neuron in the next layer. There are several non-linear functions to implement pooling. For example, maximum pooling ("max pooling") uses the maximum value from each of the cluster neurons at the prior layer. Another example is average pooling, which is the average value from each of the cluster neurons at the prior layer. The intuition is that the exact location of a feature is less important than its rough location relative to other features. A pooling layer serves to progressively reduce the spatial size of the representation, to reduce the number of parameters and amount of computation in the network, and hence to also control overfitting. It is common to periodically insert a pooling layer between successive convolutional layers in a CNN architecture, as discussed further below with reference to FIG. 6.

Local response normalization layers perform a type of "lateral inhibition" by normalizing over local input regions.

After several convolutional and max pooling layers, the high-level reasoning in a CNN may be done via fully connected layers. Neurons in a fully connected layer have connections to all activations in the previous layer, as seen in regular neural networks. Their activations can hence be computed with a matrix multiplication followed by a bias offset.

A loss layer, used in training, specifies how training penalizes the deviation between the predicted and true labels and is normally the final layer of a CNN. Various loss functions appropriate for different tasks may be used. The softmax loss function or normalized exponential function is commonly used for predicting a single class of K mutually exclusive classes. The softmax function is a generalization of the logistic function that squashes a K-dimensional vector of arbitrary real values to a K-dimensional vector of real values in the range of (0,1) that add up to 1.

An example pipeline for a CNN that may be implemented in accordance with the present disclosure discussed below with reference to FIG. 6.

The method 400 begins at 402 wherein at least one processor receives training data that includes a plurality of training images of the same dimension. In some example implementations, each training image is an image that is 224×224 pixels in size. Each of the plurality of training images is logically associated with respective label metadata that indicates whether the respective training image depicts a machine-readable symbol. For example, each image may be labeled with a 0 to indicate that the image depicts a machine-readable symbol or a 1 to indicate that the image does not depict a machine-readable symbol.

Figure 5:
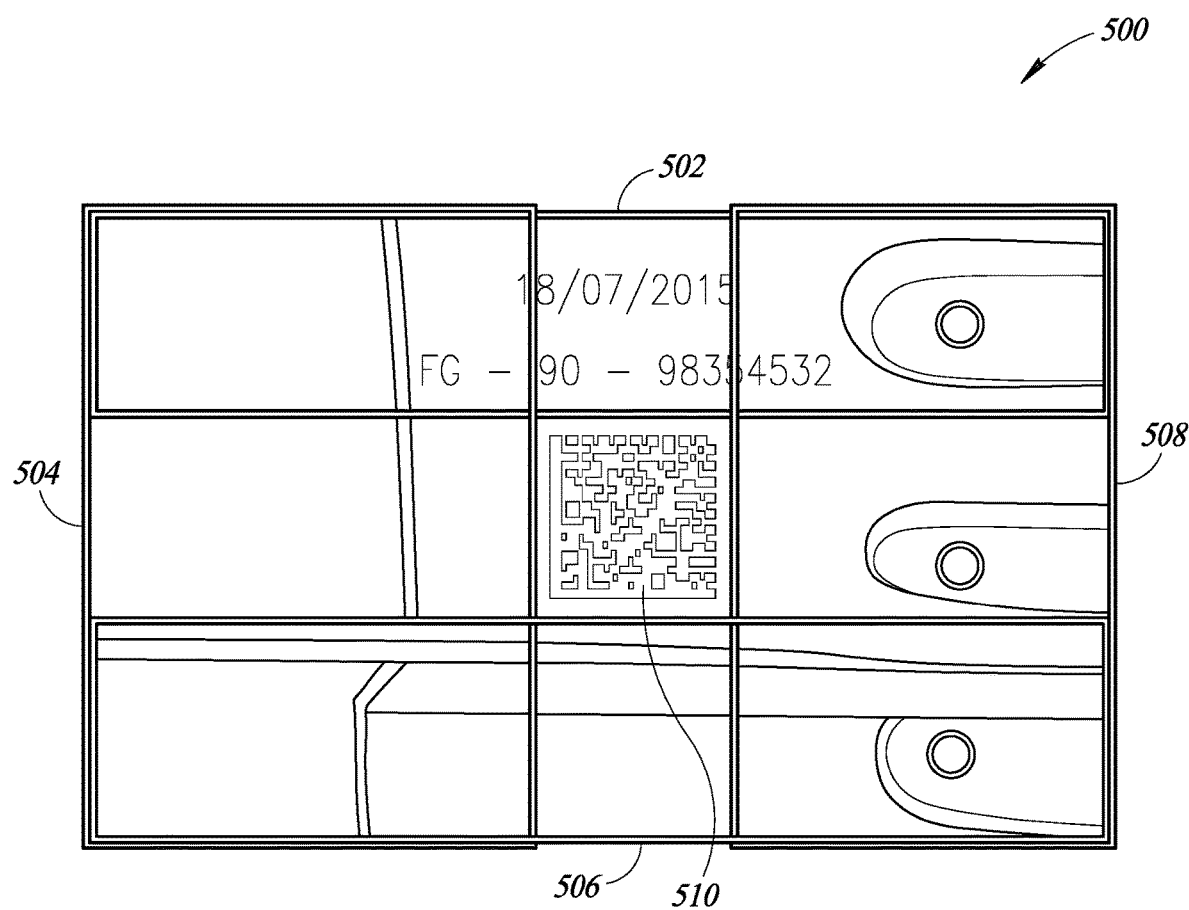
FIG. 5 is an image that includes a machine-readable symbol therein, the image shown divided into five cropped training images used to train CNN model, according to one non-limiting illustrated implementation.

FIG. 5 shows an example image 500 that may be used to provide a plurality of training examples to train the CNN. The image 500 includes a bounding box 510 that indicates the location of a machine-readable symbol (e.g., DataMatrix symbol) in the image. Using the bounding box 510, the image 500 is cropped into four regions 502, 504, 506, and 508 that do not include the machine-readable symbol to provide four negative training examples to feed into the CNN during training. Since the regions 502, 504, 506, and 508 do not contain a machine-readable symbol, they would be labeled to indicate that no machine-readable symbol is shown. For a positive training example, the entire image 500 may be used to feed into the CNN during training. The image 500 includes the machine-readable symbol (i.e., the DataMatrix symbol inside the bounding box 510) and would therefore be labeled to indicate such to provide the positive training example. Since the input size of images accepted by the CNN may be smaller (e.g., 224×224 pixels) than the size of the image 500 (e.g., 500×500 pixels, 1000×1000 pixels), the image 500 may be cropped and resized (e.g., randomly) in such a way that the machine-readable symbol is still visible in the cropped and resized image. This procedure may be performed for data augmentation purposes and to prevent or minimize overfitting. The data set of images used to train the CNN may include numerous (e.g., dozens, hundreds) cropped images similar to the cropped images shown in FIG. 5. In at least some implementations, the machine-readable symbols depicted in at least some of the training images comprise DPM machine-readable symbols.

In at least some implementations, the at least one processor may apply a random rotation, translation, and resizing of the cropped images prior to passing the images to the CNN for training. In at least some implementations, Gaussian smoothing may also be applied.

For each image captured by a machine-readable symbol reader to be used in training, different combinations of reading conditions may be applied to allow the CNN to learn to classify and localize machine-readable symbols in various conditions. The different combinations of reading conditions may include different combinations of luminance, illumination pattern (e.g., combinations of LED sectors 202*a*-*d* of FIG. 2), reading distance, etc.

At 404, the at least one processor trains a CNN model in a supervised manner based at least in part on the received training data. The CNN model receives as input a training image and its associated label metadata, and generates as output a classification indicative of whether the training image includes a machine-readable symbol. In at least some implementations, the at least one processor trains the CNN model using a transfer learning technique in which the at least one processor fine-tunes a pre-trained CNN model that has been trained on data other than the received training data. For example, the at least one processor may utilize a pre-trained CNN referred to as GoogLeNet that has been pre-trained on a set of images (e.g., ImageNet).

At 406, once training is done, the at least one processor may modify the CNN model to generate a trained localization CNN model that receives as input an input image of any dimension and generates as output an output matrix indicative of whether each of a plurality of regions of the input image includes a machine-readable symbol. Since the output matrix can be interpreted as a probability measure for the localization of a machine-readable symbol, the output elements with the higher probability will be selected as a bounding box for the localization of the machine-readable symbol in an input image.

At 408, the at least one processor may store the trained localization CNN model in a nontransitory processor-readable storage medium, where the model may be provided to and used by one or more machine-readable symbol readers to rapidly locate machine-readable symbols in captured images.

Figure 6:
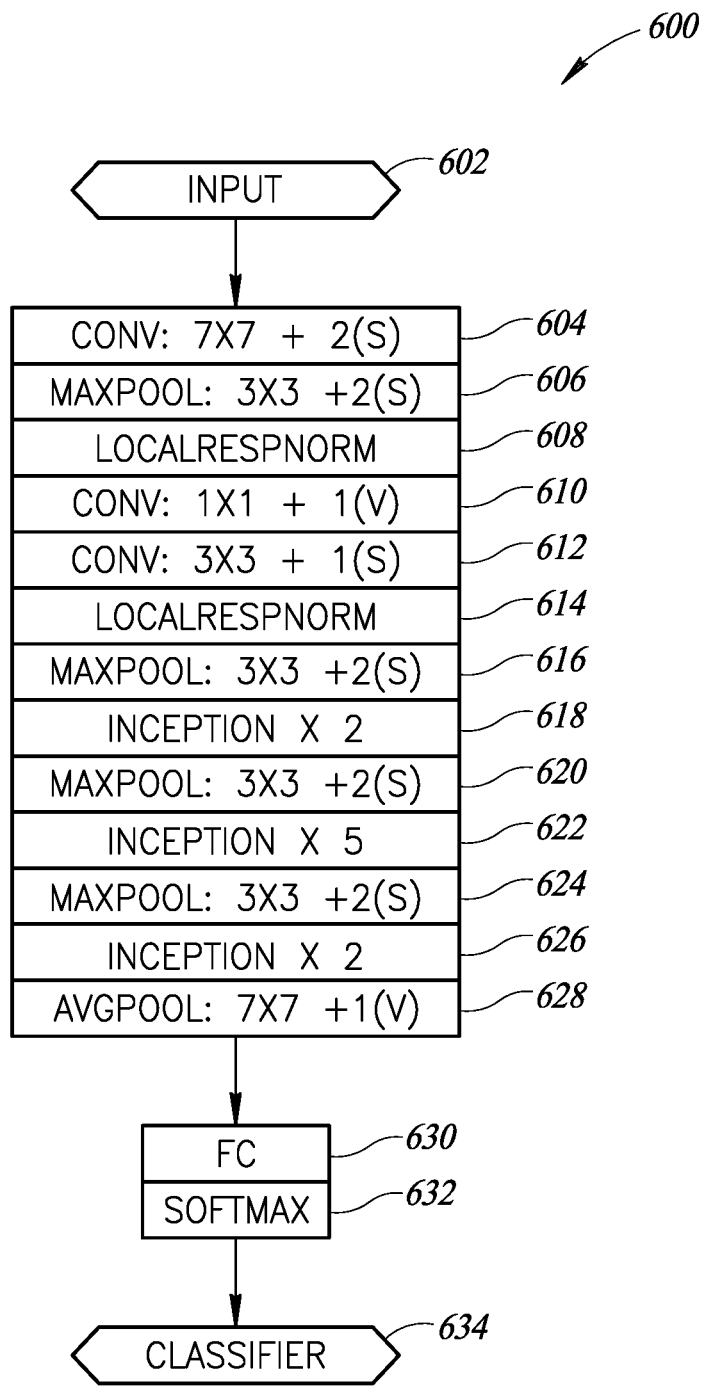
FIG. 6 is a flow diagram that illustrates an example architecture for a CNN model operative to locate machine-readable symbols in images, according to one non-limiting illustrated implementation.

FIG. 6 is a flow diagram that illustrates an example architecture for a CNN model 600 operative to locate machine-readable symbols in images captured by machine-readable symbol readers. The CNN model 600 may be trained using the method 400 of FIG. 4, for example. The CNN model 600 accepts as input 602 an input image of any dimension (e.g., 500×500 pixels, 1000×1000 pixels), and outputs via a classifier 634 an output matrix that indicates whether each of a plurality of regions of the input image includes a machine-readable symbol. The output matrix may be interpreted as a bounding box that may be used during subsequent processing of the input image, for example, to decode a machine-readable symbol depicted in the input image by processing only the region of the image within the generated bounding box that includes the machine-readable symbol.

In this example, the CNN model 600 includes three convolutional layers 604, 610, and 612, five pooling layers 606, 616, 620, 624, and 628, two local response normalization layers 608 and 614, nine inception layers 618, 622, and 626, a fully connected layer 630, and a softmax loss layer 632. In particular, the CNN model 600 includes a 7×7+2(S) convolutional layer 604, a 3×3+2(S) max pooling layer 606, a local response normalization layer 608, a 1×1+1(V) convolutional layer 610, a 3×3+1(S) convolutional layer 612, a local response normalization layer 614, a 3×3+2(S) max pooling layer 616, two inception layers 618, a 3×3+2(S), a max pooling layer 620, five inception layers 622, a 3×3+2 (S), a max pooling layer 624, two inception layers 626, a 7×7+1(V), an average pooling layer, the fully connected layer 630, the softmax loss layer 632, and the classifier 634.

The operation of the convolutional layers, local response normalization layers, pooling layers, fully connected layers, and softmax layers are discussed above. Each of the inception layers computes multiple different transformations over the same input map in parallel, concatenating their result into a single output. In other words, each inception layer may compute one or more convolutions, one or more pooling operations, and then concatenate the results into a single output.

Figure 7:
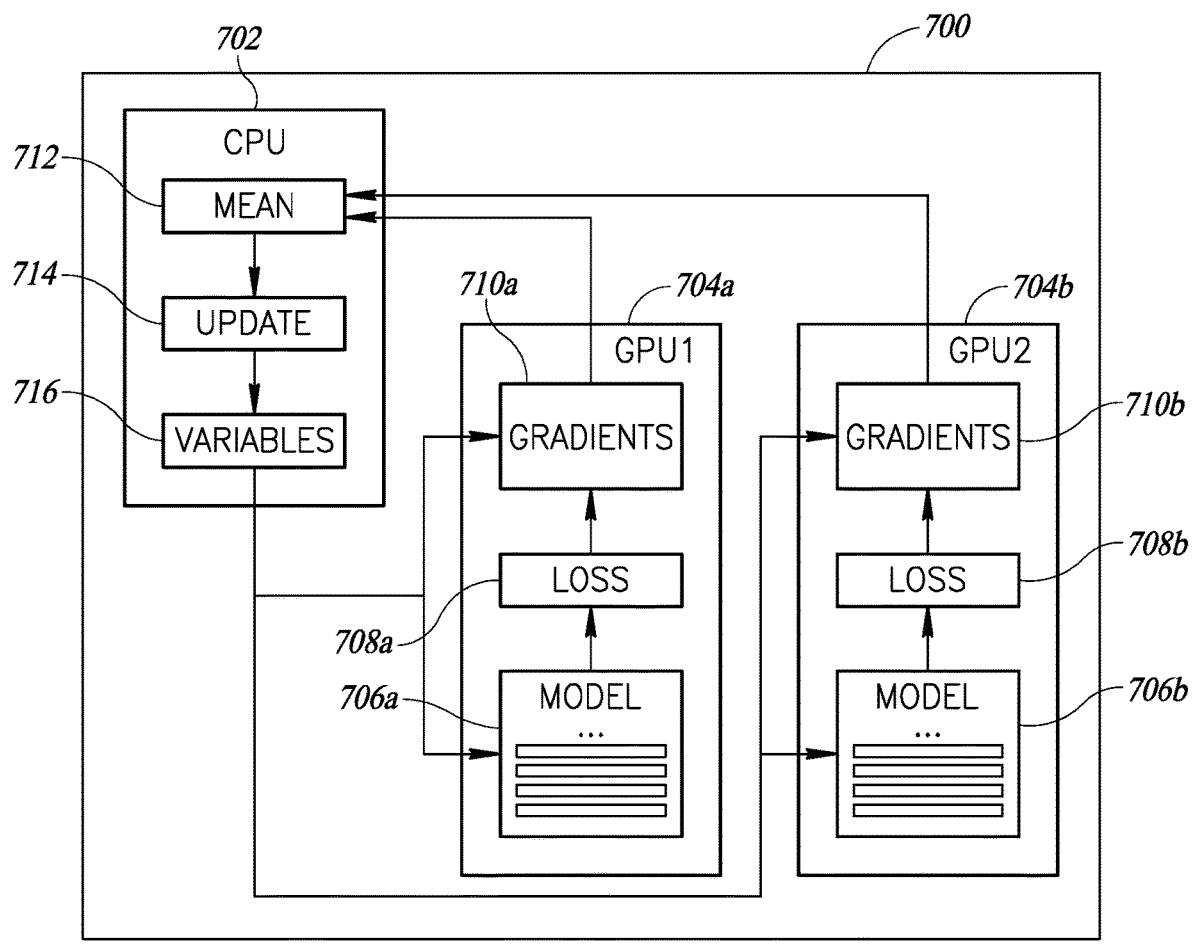
FIG. 7 is a schematic block diagram of an example computing environment in which a CNN model may be trained, according to one non-limiting illustrated implementation.

FIG. 7 is a schematic block diagram of an example computing environment 700 in which a CNN model may be trained, such as the CNN model 600 of FIG. 6. Training deep networks can be extremely computationally intensive. Since CNNs are inherently parallel algorithms, the training process can be distributed across multicore CPUs, graphical processing units (GPUs), or clusters of computers with multiple CPUs and GPUs.

The illustrated computing environment 700 includes a central processing unit (CPU) 702 operatively coupled to two graphics processing units (GPUs) 704*a* and 704*b*. It should be appreciated that, in at least some implementations, the CPU 702 may be operatively coupled to more than two processing units, such as a cluster of CPUs, GPUs, and/or other types of processors.

Training a CNN model in a parallel, distributed manner requires the coordination of training processes. In this example, each of the GPUs 704*a* and 704*b* may have similar speed and may include sufficient memory to run an entire CNN model. Model replicas 706*a* and 706*b* are stored on the GPUs 704*a* and 704*b*, respectively. In operation, to avoid training on a stale copy of the model parameters, the model parameters are updated synchronously by waiting for each of the GPUs 704*a* and 704*b* to finish processing each batch of data.

Each of the GPUs 704*a* and 704*b* computes loss 708*a* and 708*b*, respectively, as well as the gradients 710*a* and 710*b*, respectively, for a unique batch of data. This setup permits dividing a larger batch of data across the GPUs 704*a* and 704*b*. This setup also requires that the GPUs 704*a* and 704*b* share the model parameters. Since transferring data to and from GPUs is relatively slow, the model parameters 716 may be stored and updated on the CPU 702. A fresh set of model parameters 716 is transferred to each of the GPUs 704*a* and 704*b* when a new batch of data is processed by the GPUs.

The GPUs 704*a* and 704*b* are synchronized in operation. All gradients 710*a* and 710*b* are accumulated from the GPUs 704*a* and 704*b*, respectively, and are averaged at block 712. The model parameters 716 are updated at block 714 with the gradients averaged across each of the model replicas 706*a* and 706*b*.

Figure 8:
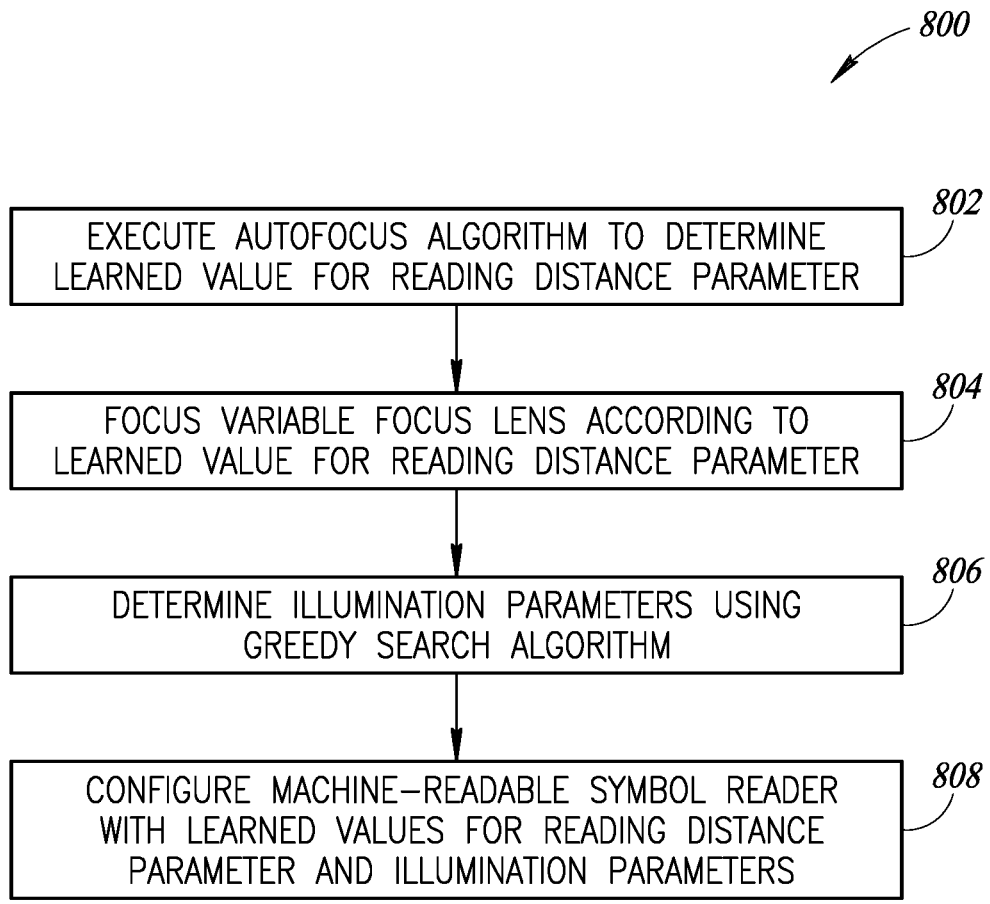
FIG. 8 is a flow diagram of a method of operating a machine-readable symbol reader to implement an autonomous learning phase of the machine-readable symbol reader that includes a reading distance parameter determination phase and an illumination parameters determination phase, according to one non-limiting illustrated implementation.

FIG. 8 is a flow diagram of a method 800 of operating a machine-readable symbol reader to implement an autonomous learning phase of the machine-readable symbol reader in which optimal, or at least sufficient, reading conditions are learned. For example, the method 800 may be performed once during installation of a machine-readable symbol reader in a manufacturing facility or other type of facility. Additionally or alternatively, the method 800 may be performed from time-to-time as desired to determine optimal reading conditions for a machine-readable symbol reader.

The autonomous learning phase may include a reading distance parameter determination phase in which the machine-readable symbol reader determines a reading distance parameter usable to set a focus of a variable focus lens element of the machine-readable symbol reader, and an illumination parameters determination phase in which the machine-readable symbol reader determines one or more illumination parameters (e.g., luminance, illumination pattern) that may be used to configure the machine-readable symbol reader to capture images in desirable reading conditions. The one or more illumination parameters may include one or more parameters associated with an illumination pattern generated by at least one light source of the machine-readable symbol reader, exposure time, gain, etc. As discussed further below, the one or more illumination parameters may include a determined reduced subset of controllable illumination parameters of the machine-readable symbol reader.

The method 800 begins at 802 wherein at least one processor of a machine-readable symbol reader executes an autofocus algorithm to determine a learned value for a reading distance parameter. An example autofocus algorithm that may be used to determine a learned value for the reading distance is discussed below with reference to FIG. 9.

At 804, the at least one processor of the machine-readable symbol reader focuses the variable focus lens according to the learned value for the reading distance parameter determined as a result of the autofocus algorithm.

At 806, the at least one processor determines one or more illumination parameters using a greedy search algorithm. An example greedy search algorithm used to determine the one or more illumination parameters is discussed below with reference to FIGS. 10-14D.

At 808, the at least one processor configures the machine-readable symbol reader with the learned values for the reading distance parameter and the one or more illumination parameters. Once the machine-readable symbol reader has been configured with the learned values, the machine-readable symbol reader may then be used to capture images under the optimized reading conditions determined during the autonomous learning phase.

Figure 9:
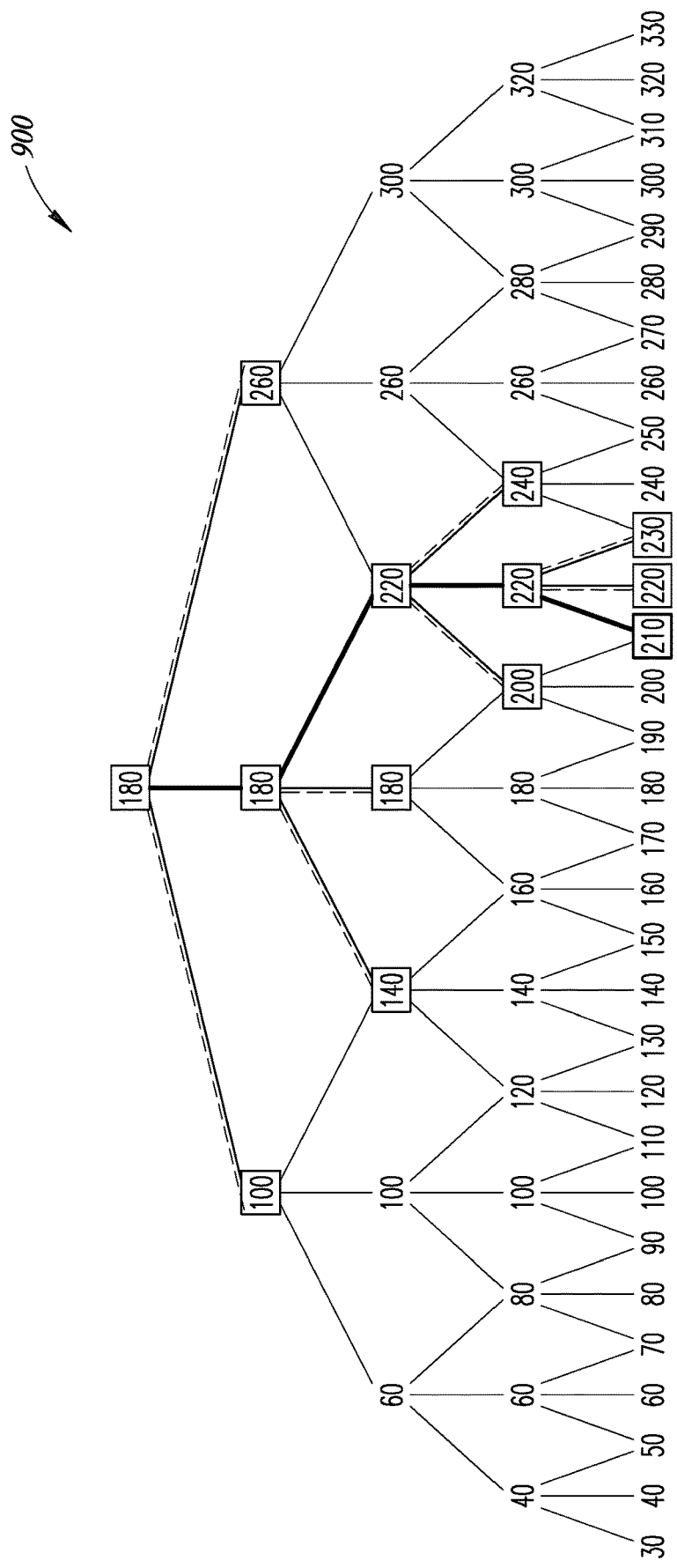
FIG. 9 is a schematic diagram that illustrates a search tree for a greedy search algorithm utilized to implement the reading distance parameter determination phase of the method of FIG. 8, according to one non-limiting illustrated implementation.

FIG. 9 is a schematic diagram that illustrates a search tree 900 for a greedy search autofocus algorithm utilized to implement the reading distance parameter determination phase of the method 800 of FIG. 8. Generally, the autofocus algorithm receives as input a plurality of localized images captured a different reading distances, and outputs a reading distance that provides the best focus. In at least some implementations, the objective of the autofocus algorithm is to find the image with the greatest brightness variance, after applying a Laplacian filter, by analyzing images at different distances.

The search tree 900 illustrates an example of searching for the best reading distance in a range of 30 millimeters (mm) to 330 mm, step size of 10 mm, by exploring the search tree using a greedy search algorithm. In this example, the dashed lines indicate branches that were explored, and the bold lines indicate the path taken to reach the optimal solution of 210 mm in this example.

The search tree begins at the 180 mm node. Initially, localized images are captured at 100 mm, 180 mm and 260 mm. In this example, the algorithm determines that 180 mm provides the best focus of the three choices, e.g., by determining that the brightness variance is the greatest in the image captured at 180 mm. Next, localized images are captured at 140 mm and 220 mm. In this example, the algorithm determines that 220 mm provides the best focus of the three choices (i.e., 140 mm, 180 mm, and 220 mm). Then, localized images are captured at 200 mm and 240 mm. In this example, the algorithm determines that 210 mm provides the best focus of the three choices (i.e., 200 mm, 220 mm, and 240 mm). The autofocus algorithm then sets the reading distance parameter to the learned value of 210 mm.

Figure 10:
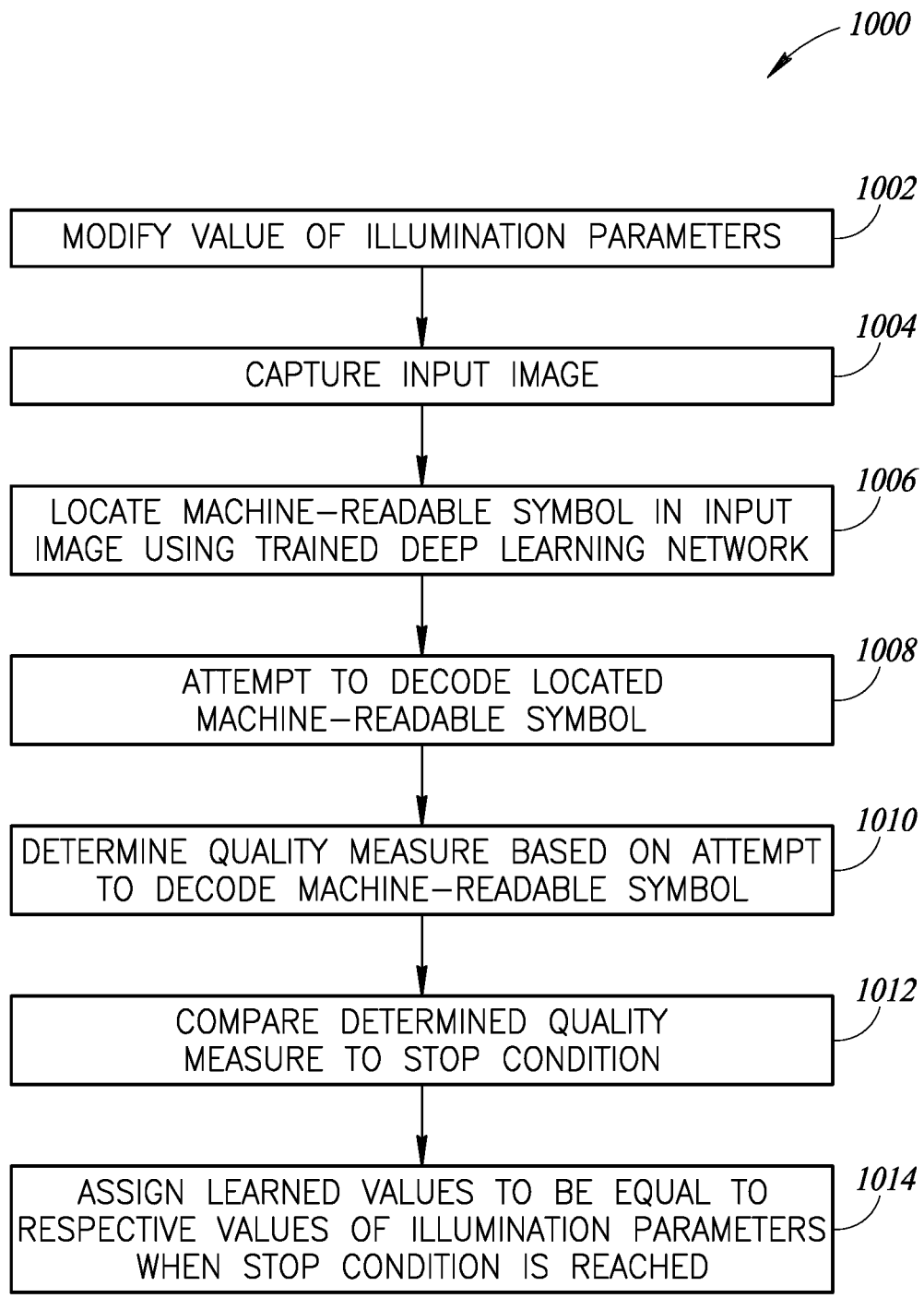
FIG. 10 is a flow diagram of a method of operating a machine-readable symbol reader to implement the illumination parameters determination phase of the method of FIG. 8, according to one non-limiting illustrated implementation.

FIG. 10 is a flow diagram of a method 1000 of operating a machine-readable symbol reader to implement the illumination parameters determination phase of the method 800 of FIG. 8. The method 1000 may be implemented iteratively until a stop condition is reached, for example.

At 1002, the at least one processor of the machine-readable symbol reader modifies a value of at least one of the one or more illumination parameters. For example, the at least one processor may modify one or more parameters associated with an illumination pattern generated by at least one light source of the machine-readable symbol reader, exposure time, or gain. As discussed further below, in at least some implementations the one or more illumination parameters may include a reduced subset of controllable illumination parameters of the machine-readable symbol reader.

At 1004, the machine-readable symbol reader captures an input image when the variable focus lens is focused at the reading distance determined using the autofocus algorithm discussed above, and the one or more illumination parameters are set to values configured at 1002 discussed above.

At 1006, the at least one processor locates at least one machine-readable symbol in the captured input image using a trained deep learning network, as discussed above with reference to FIGS. 4-7.

At 1008, the at least one processor attempts to decode the located at least one machine-readable symbol. For example, the at least one processor may utilizes a decoder library configured with illumination parameters determined at 1002 to attempt to decode the located machine-readable symbol.

At 1010, the at least one processor determines a quality measure based at least in part on the attempt to decode the machine-readable symbol. In at least some implementations, the quality measure includes a value associated with a percentage (e.g., 90%, 8 out of 10) of the attempts to decode the machine-readable symbol that are successful. In at least some implementations, the quality measure includes a value associated with the amount of time required to successfully decode a machine-readable symbol in the image, which may be indicative of the desirability of the reading conditions.

At 1012, the at least one processor may compare the determined quality measure to the stop condition. For example, the stop condition may be one or more values for the quality measure(s) that are deemed to be optimal or acceptable for reading and decoding machine-readable symbols.

At 1014, once the stop condition has been reached, the at least one processor assigns the learned values to be equal to the respective values of the one or more illumination parameters when the stop condition was reached.

In at least some implementations, the one or more illumination parameters modified to determine the optimal reading conditions for a machine-readable symbol reader may include a reduced subset of controllable illumination parameters of the machine-readable symbol reader. For example, in at least some implementations, the illumination parameters may include a reduced set of "luminance" parameters and a set of combinations of possible illumination patterns.

As a non-limiting example, in some implementations, a luminance parameter domain may be defined that includes 10 exposure time values when an internal lighting (strobe) value is set to 2, 11 exposure time values when the internal lighting value is set to 4, and 23 gain values for each exposure time. This provides a reduced luminance parameter domain of 483 values (i.e., (10+11)×23=483) that may be evaluated during the autonomous learning phase. In one example, the illumination pattern domain may include 15 combinations of illumination patterns of four sectors of light sources, such as the four sectors 202a-202d of FIG. 2. Thus, in this example, for each of the 15 possible illumination patterns, there are 483 possible luminance values to explore to determine the optimal reading condition in terms of both luminance and illumination pattern parameters.

Figure 11:
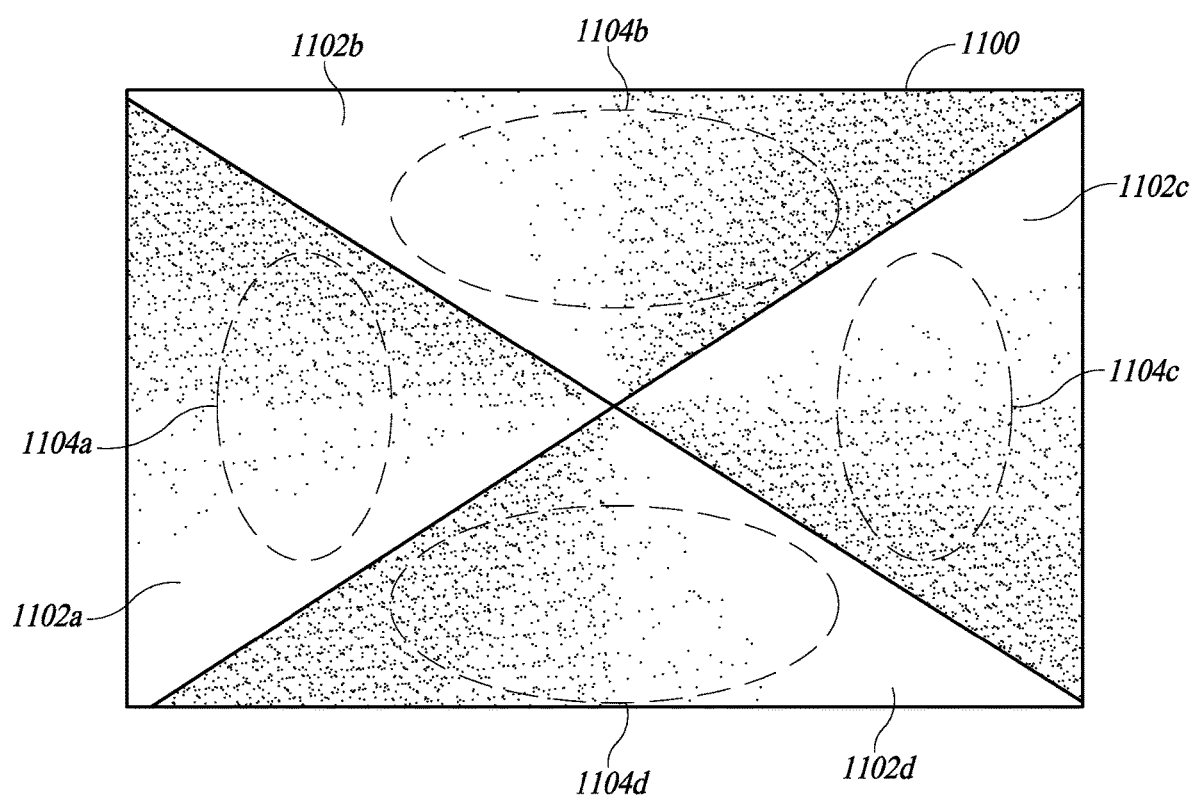
FIG. 11 is a pattern that may be used to derive a domain for one or more illumination parameters of a machine-readable symbol reader, according to one non-limiting illustrated implementation.

FIG. 11 is a pattern 1100 that may be used to derive a domain for the luminance parameter of a machine-readable symbol reader. The pattern 1100 is divided into four sectors 1102a-1102d that each contain an entire grayscale range. The dashed ovals 1104a-1104d illustrate regions illuminated by the four sectors of light sources, such as the sectors 202a-202d of FIG. 2.

Figure 12:
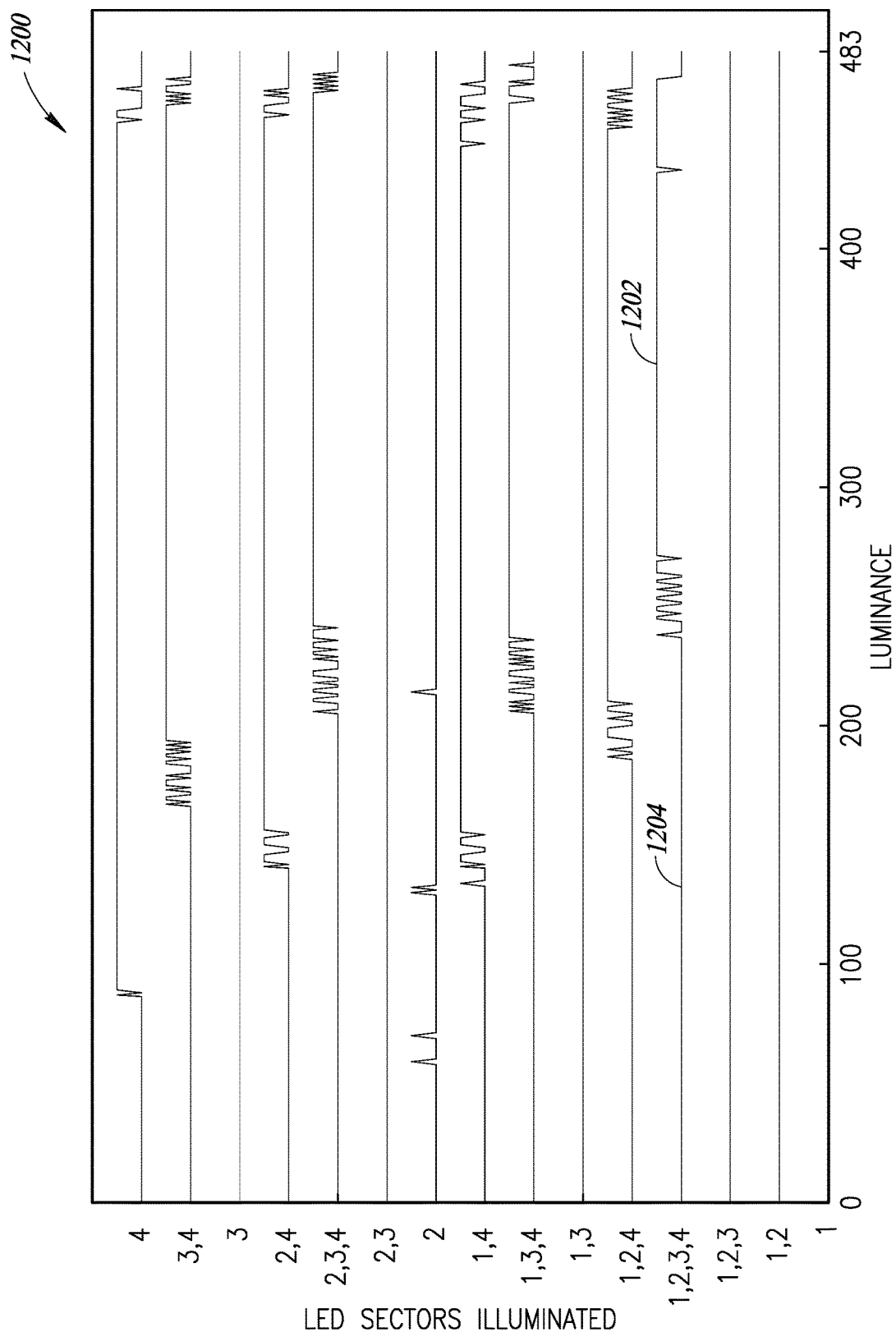
FIG. 12 is a graph that shows whether a machine-readable symbol reader was able to decode a machine-readable symbol as a function of both luminance (x-axis) and illumination pattern (y-axis), according to one non-limiting illustrated implementation.

FIG. 12 is a graph 1200 that shows results indicating whether a machine-readable symbol reader was able to decode a machine-readable symbol as a function of both luminance (x-axis) and illumination pattern (y-axis). In particular, the x-axis represents the above-defined luminance parameter which has a domain between 1 and 483, and the y-axis represents the 15 combinations of illumination patterns, wherein "1" indicates that only a first sector is illuminated, "1,2" indicates that only the first and second sectors are illuminated, etc. In the graph 1200, the machine-readable symbol reader was able to decode the machine-readable symbol when the signal is high (e.g., at 1202 for the "1,2,3,4" sector combination), and the machine-readable symbol reader was not able to decode the machine-readable symbol when the signal is low (e.g., at 1204 for the "1,2,3,4" sector combination). As can be seen in FIG. 12, advantageously, given a single illumination pattern, the "read" conditions are generally grouped together if the solution space is sorted by luminance. This feature allows for an efficient search of the solution space to identify an optimal or suitable reading condition.

The best solution for the luminance and illumination parameters may be found in a "local optimum" in the entire "solution space." Typically, there may be more combinations of parameters that would allow a machine-readable symbol reader to decode a machine-readable symbol. Since the reading distance has been determined and the images have been localized, as discussed above, the reduced dimensionality illumination parameters can be quickly searched to identify the best reading condition for a particular application.

Figure 13:
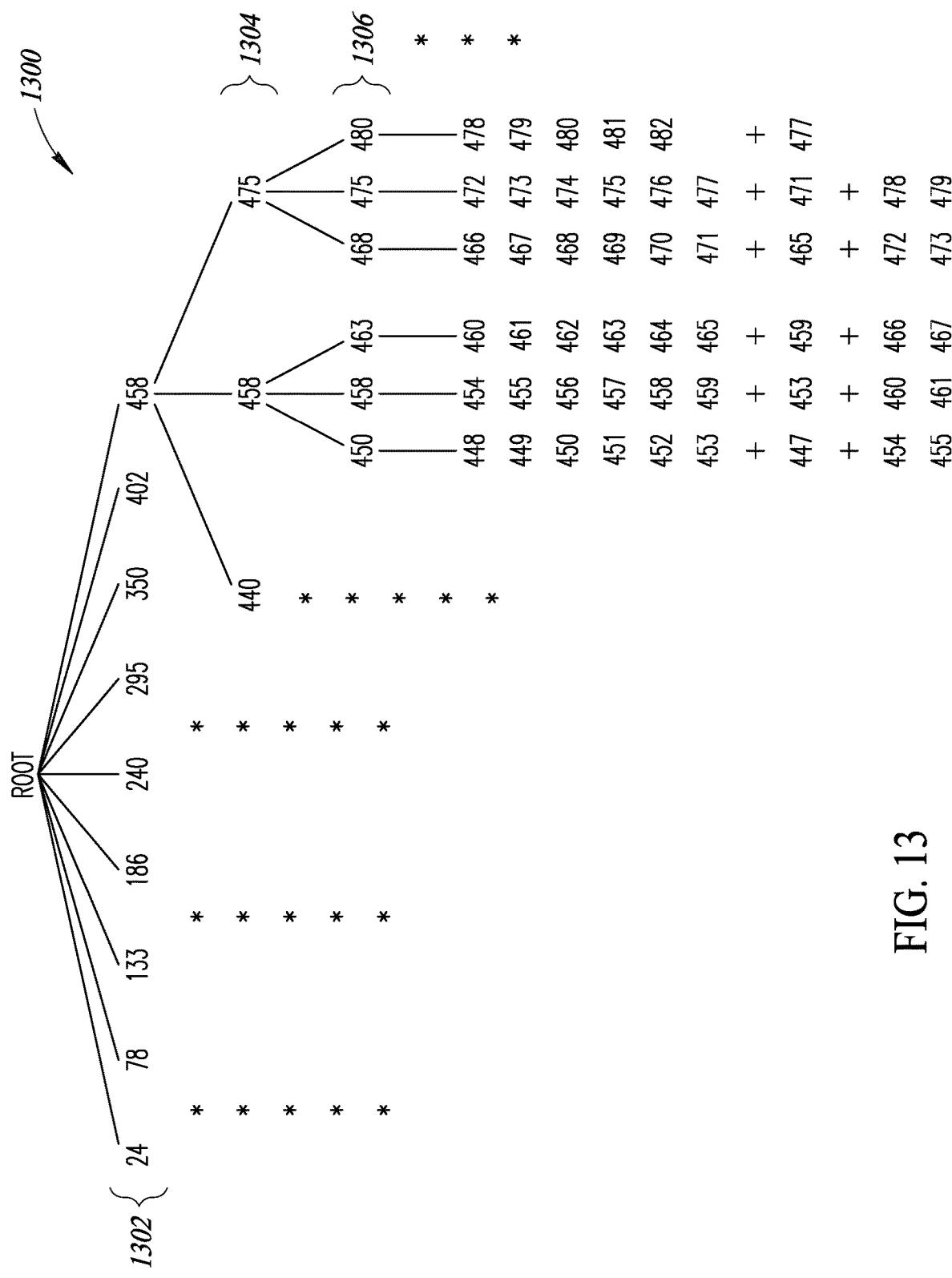
FIG. 13 is a schematic diagram that illustrates a search tree for a greedy search algorithm utilized to implement the illumination parameters determination phase of the method of FIG. 8, according to one non-limiting illustrated implementation.

FIG. 13 is a schematic diagram that illustrates a search tree 1300 for a greedy search algorithm utilized to search for optimal luminance parameters for a machine-readable symbol reader. The search tree 1300 depicts exploration of luminance parameters for a single illumination pattern. Thus, the search tree may be replicated for each of the number of combinations of illumination patterns (e.g., 15 patterns) to determine the optimal values for luminance and illumination pattern.

Initially, at a level 1302, nine distributed luminance values are evaluated. In at least some implementations, the at least one processor may explore distributed luminance values, preferring luminance values with low "gain" and high "exposure time," as such tend to be the best candidates. In this example, the nine luminance values may be explored for each of the 15 possible illumination patterns, thus 135 (i.e., 9×15) combinations are initially explored.

If a "read" condition is found at the level 1302, then the at least one processor may determine one or more quality measures to determine whether a stop condition is satisfied. The quality measure may include one or more criteria, such as quality grading, decoding time, successful decoding rate, etc. For example, the at least one processor may determine whether a quality measure is greater than a certain threshold and/or a determined number or percentage of reads are successful (e.g., 95 percent reads successful, 10 out of 10 reads successful). If a stop condition is not reached, the at least one processor progresses through lower levels 1304, 1306, etc., by selecting the best reading condition at the previous level and generating a new distributed search space (e.g., 440, 458, 475), until the stop condition is reached. If the stop condition is never reached, the algorithm may end after a preset time or after a certain number of iterations.

Figure 14A:
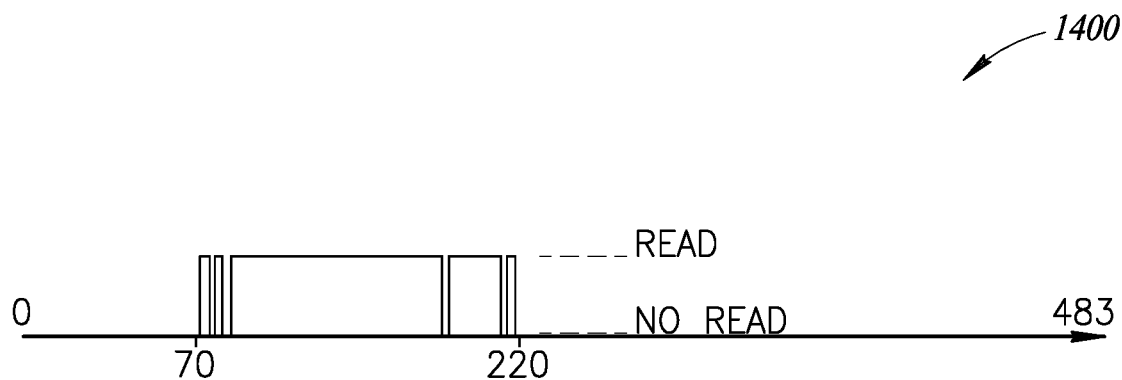
FIGS. 14A-14D are graphs that show an example progression of a greedy search algorithm utilized to implement the illumination parameters determination phase of the method of FIG. 8, according to one non-limiting illustrated implementation.

FIGS. 14A-14D are graphs 1400 that show an example progression of a greedy search algorithm utilized to implement the illumination parameters determination phase for one of the illumination patterns (e.g., one of the 15 illumination patterns represented in FIG. 11). As shown in FIG. 14A, in this illustrated example, the machine-readable symbol reader is generally able to decode a machine-readable symbol when the luminance value is in the range of approximately 70 to 220 on the scale of 1 to 483.

Figure 14B:
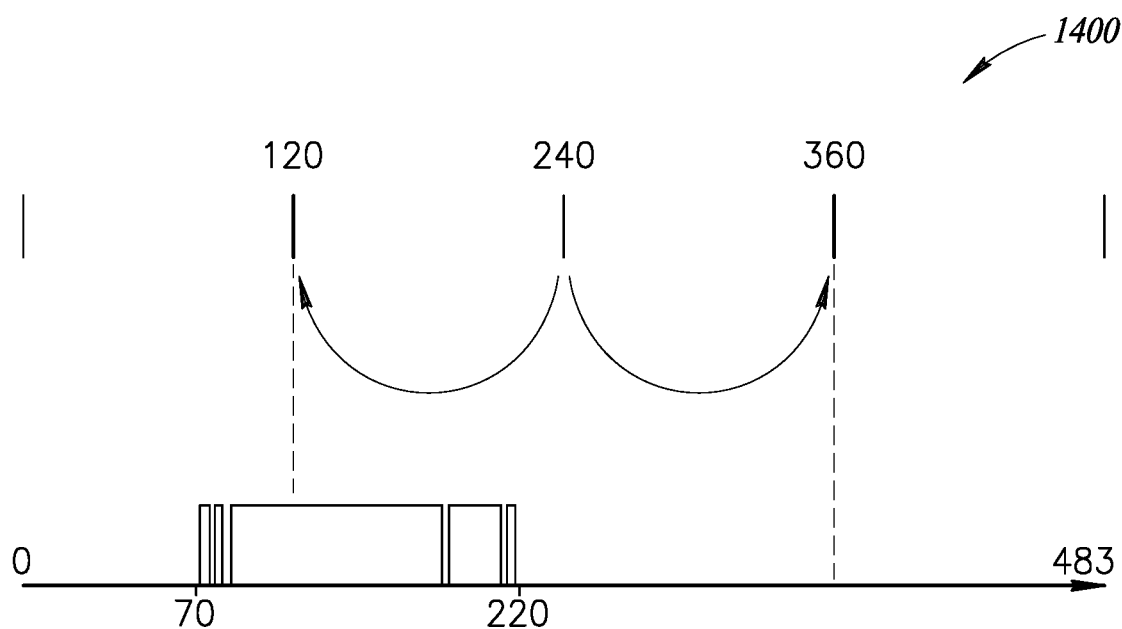

As shown in FIG. 14B, the at least one processor may initially explore distributed luminance values of 120, 240 and 360. In this example, this results in a "read" acquisition for a luminance value of 120, and "no read" acquisitions for luminance values of 240 and 360.

Figure 14C:
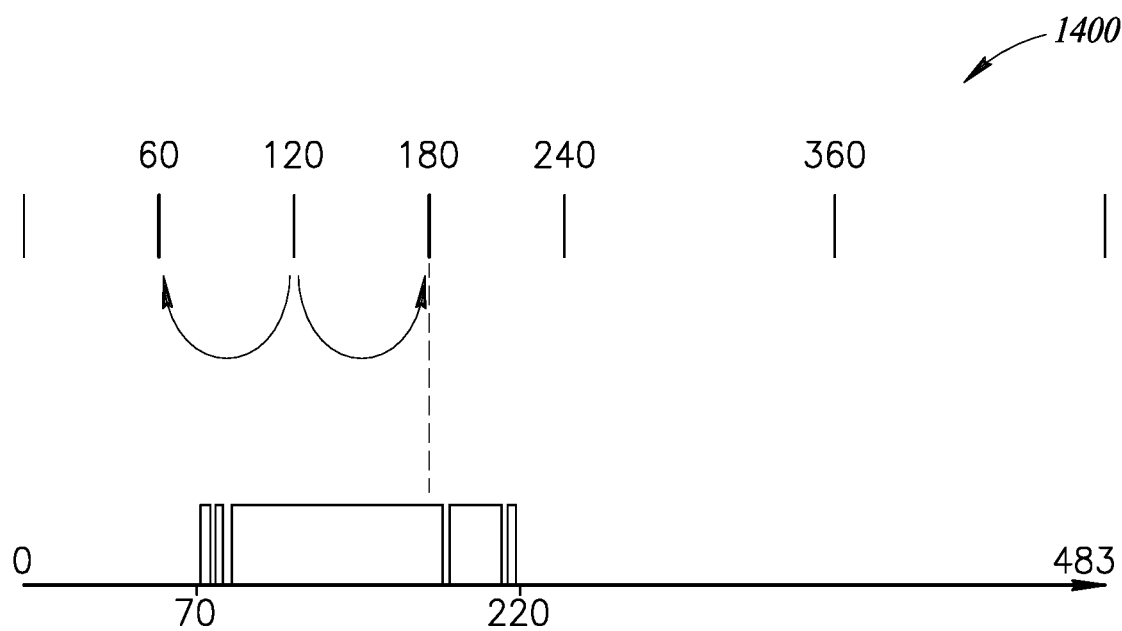

As shown in FIG. 14C, the algorithm may then start with the luminance value of 120 for which a "read" acquisition was obtained, and search a distributed space around that value, e.g., a value of 60 below the value of 120 and a value of 180 above the value of 120. In this example, this search results in a "read" condition at the values of 120 and 180 and a "no read" condition at the value of 60.

Figure 14D:
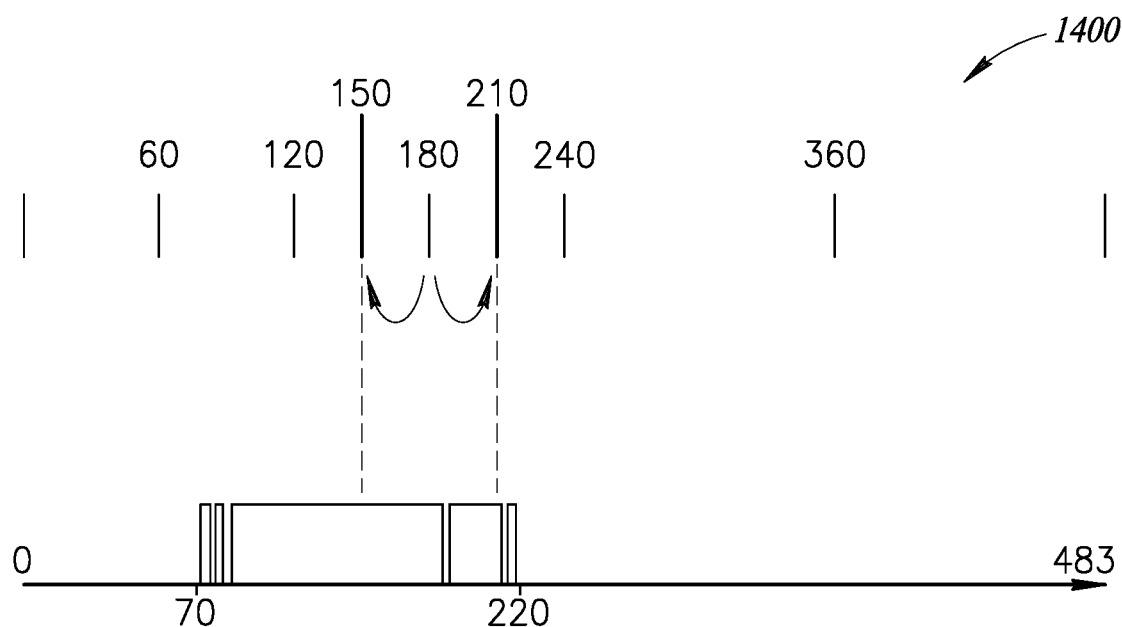

As shown in FIG. 14D, the algorithm may then explore luminance values proximate 180, namely luminance values 150 and 210. At each level, if multiple acquisitions result in a "read" condition, the process may select one of the acquisitions based on a quality measure (e.g., which value resulted in the shortest decoding time). This process may continue until a stop condition is reached, which indicates that reading conditions that meet specified criteria have been determined. As discussed above, the determined parameters may then be used to configure the machine-readable symbol reader to provide accurate reading of machine-readable symbol reader during use.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A machine-readable symbol reader, comprising:
   an imager subsystem comprising an image sensor and a variable focus lens;
   at least one nontransitory processor-readable storage medium that stores at least one of processor-executable instructions or data; and
   at least one processor communicatively coupled to the imager subsystem and the at least one nontransitory processor-readable storage medium, in operation, the at least one processor:
   configures a set of reading parameters of the machine-readable symbol reader to learned values previously determined during an initial autonomous learning phase;
   controls the imager subsystem to capture an input image with the set of reading parameters configured to the learned values;
   locates at least one machine-readable symbol in the input image using a trained deep learning network;
   decodes the located at least one machine-readable symbol; and
   stores the at least one decoded machine-readable symbol in the at least one nontransitory processor-readable storage medium.

2. The machine-readable symbol reader of claim 1 wherein the set of reading parameters comprises one or more parameters associated with lighting condition, focus, or decoder parameters.

3. The machine-readable symbol reader of claim 1 wherein the set of reading parameters comprises one or more parameters associated with an illumination pattern generated by at least one light source of the machine-readable symbol reader, exposure time, or gain.

4. The machine-readable symbol reader of claim 1 wherein the trained deep learning network receives as input the input image, and generates as output an output matrix indicative of whether each of a plurality of regions of the input image includes a machine-readable symbol.

5. The machine-readable symbol reader of claim 1 wherein the trained deep learning network comprises a plurality of convolutional layers, a plurality of maximum pooling layers, and a plurality of inception layers.

6. The machine-readable symbol reader of claim 1 wherein the trained deep learning network comprises a deep learning network that has been pre-trained using non-background images other than images of machine-readable symbols.

7. A machine-readable symbol reader, comprising:
   an imager subsystem comprising an image sensor and a variable focus lens;
   at least one nontransitory processor-readable storage medium that stores at least one of processor-executable instructions or data; and
   at least one processor communicatively coupled to the imager subsystem and the at least one nontransitory processor-readable storage medium, in operation, the at least one processor:
   implements an autonomous learning phase, in which the at least one processor:
   executes an autofocus algorithm to determine a learned value for a reading distance parameter;
   focuses the variable focus lens according to the learned value for the reading distance parameter;
   determines one or more illumination parameters using a greedy search algorithm; and
   configures the machine-readable symbol reader with the learned values for the reading distance parameter and the one or more illumination parameters.

8. The machine-readable symbol reader of claim 7 wherein to determine the one or more illumination parameters using a greedy search algorithm, the at least one processor:
   iteratively, until a stop condition is reached,
   modifies a value of at least one of the one or more illumination parameters;
   captures an input image;
   locates at least one machine-readable symbol in the input image using a trained deep learning network;
   attempts to decode the located at least one machine-readable symbol;
   determines a quality measure based at least in part on the attempt to decode the machine-readable symbol;
   compares the determined quality measure to the stop condition; and
   assigns the learned values to be equal to the respective values of the one or more illumination parameters when the stop condition is reached.

9. The machine-readable symbol reader of claim 8 wherein the quality measure comprises a value associated with a percentage of the attempts to decode the machine-readable symbol that are successful.

10. The machine-readable symbol reader of claim 8 wherein the at least one processor modifies a value of at least one of the one or more illumination parameters based at least in part on an amount of time required to successfully decode a machine-readable symbol.

11. The machine-readable symbol reader of claim 7 wherein the one or more illumination parameters comprise one or more parameters associated with an illumination pattern generated by at least one light source of the machine-readable symbol reader, exposure time, or gain.

12. The machine-readable symbol reader of claim 7 wherein the one or more illumination parameters comprises a reduced subset of controllable illumination parameters of the machine-readable symbol reader.

13. The machine-readable symbol reader of claim 7 wherein, to execute the autofocus algorithm, the at least one processor:
   determines a focus measure for each of a plurality of captured input images, and searches for a best reading distance parameter using a greedy search algorithm based on the determined focus measures.

14. The machine-readable symbol reader of claim 7 wherein, to execute the autofocus algorithm, the at least one processor:
captures a plurality of input images when the reading distance parameter is set at differing values; and
for each of the input images, attempts to locate at least one machine-readable symbol using a trained deep learning network.

15. The machine-readable symbol reader of claim 1, wherein,
in operation, to train the deep learning network the at least one processor:
receives training data comprising a plurality of training images of the same dimension, each of the plurality of training images associated with respective label metadata that indicates whether the respective training image depicts a machine-readable symbol;
trains a convolutional neural network (CNN) model in a supervised manner based at least in part on the received training data, wherein the CNN model receives as input a training image and its associated label metadata, and generates as output a classification indicative of whether the training image includes a machine-readable symbol;
modifies the CNN model to generate a trained localization CNN model that receives as input an input image of any dimension and generates as output an output matrix indicative of whether each of a plurality of regions of the input image includes a machine-readable symbol; and
stores the trained localization CNN model in the non-transitory processor-readable storage medium.

16. The machine-readable symbol reader of claim 15 wherein the at least one processor:
trains the CNN model using a transfer learning technique in which the at least one processor fine-tunes a pre-trained CNN model that has been trained on data other than the received training data.

17. The machine-readable symbol reader of claim 15 wherein at least some of the training images comprise images that depict direct part marking (DPM) machine-readable symbols.

18. The machine-readable symbol reader of claim 15 wherein the at least one processor generates the training data, wherein, to generate the training data, the at least one processor:
receives a plurality of initial images, the images captured by a machine-readable symbol reader at various combinations of reading conditions;
for each of the initial images, generates a plurality of cropped images, each of the cropped images comprising a portion of the initial image; and
logically associates label metadata with each of the cropped images, the label metadata indicative of whether the cropped image includes a machine-readable symbol.

19. The machine-readable symbol reader of claim 18 wherein the at least one processor:
at least one of rotates, translates, or resizes at least some of the cropped images.

20. The machine-readable symbol reader of claim 15 wherein the trained localization CNN model comprises a plurality of convolutional layers, a plurality of maximum pooling layers, and a plurality of inception layers.

* * * * *